US00RE48789E

(19) United States
(12) Reissued Patent
Bundy et al.

(10) Patent Number: US RE48,789 E
(45) Date of Reissued Patent: Oct. 26, 2021

(54) DRYWALL JOIST HANGER

(71) Applicant: Simpson Strong-Tie Company Inc., Pleasanton, CA (US)

(72) Inventors: Gregory D. Bundy, Columbus, OH (US); Dustin P. Muhn, San Francisco, CA (US); Thomas G. Evans, Dublin, CA (US); Daniel M. Gray, McKinney, TX (US)

(73) Assignee: Simpson Strong-Tie Company Inc., Pleasanton, CA (US)

(21) Appl. No.: 16/040,467

(22) Filed: Jul. 19, 2018

Related U.S. Patent Documents

Reissue of:
(64) Patent No.: 9,394,680
Issued: Jul. 19, 2016
Appl. No.: 14/106,714
Filed: Dec. 14, 2013

(51) Int. Cl.
*E04B 1/26* (2006.01)
*E04B 5/12* (2006.01)

(52) U.S. Cl.
CPC ..... *E04B 1/2612* (2013.01); *E04B 1/26* (2013.01); *E04B 5/12* (2013.01)

(58) Field of Classification Search
CPC ..... E04B 1/2612
See application file for complete search history.

(56) References Cited

U.S. PATENT DOCUMENTS 537,505 A * 4/1895 Van Dorn ..... 29/897.3
804,451 A 11/1905 Carlson
1,692,351 A 11/1928 Ropp ..... E04B 1/2612 52/702
1,728,981 A 9/1929 Ropp
2,461,145 A * 2/1949 Craver ..... E04B 1/2612 248/217.4
2,815,546 A 12/1957 Kenk
2,911,690 A * 11/1959 Sanford ..... E04B 1/2608 248/214
3,125,785 A 3/1964 Conville
3,337,946 A 8/1967 Anderson et al.
3,420,560 A 1/1969 Pfahning
3,601,428 A 8/1971 Glib
3,633,950 A 1/1972 Glib
(Continued)

FOREIGN PATENT DOCUMENTS

DE 9319125 U1 2/1994
EP 1672133 6/2006
(Continued)

OTHER PUBLICATIONS

*Columbia Insurance Co. et al.* v. *Simpson Strong-Tie Company, Inc.*, Case No. 3:19-cv-04683, Plaintiffs' Notice of Motion and Motion for Preliminary Injunction; Memorandum of Points and Authorities in Support of Motion, filed in the case on Aug. 12, 2019, 20 pages.
(Continued)

*Primary Examiner* — Russell D Stormer
(74) *Attorney, Agent, or Firm* — Charles R. Cypher

(57) ABSTRACT

A connection utilizing a joist hanger to hang a generally horizontal joist or beam from a wood structural support member such as a top plate or header in cooperation with a first plurality of fasteners such as screws and one or more generally vertical drywall panels.

34 Claims, 13 Drawing Sheets

(56) References Cited

U.S. PATENT DOCUMENTS 3,752,512 A 8/1973 Glib
3,907,445 A 9/1975 Wendt
3,945,741 A * 3/1976 Wendt ..... E04B 1/5818 403/191
3,972,169 A * 8/1976 Sheppard, Jr. ..... E04B 1/2612 248/300
3,989,398 A 11/1976 Wendt
4,005,942 A 2/1977 Glib
4,038,796 A * 8/1977 Eckel ..... E04B 2/721 52/220.7
4,077,176 A 3/1978 Bauer
4,196,556 A 4/1980 Russo
4,230,416 A 10/1980 Glib
4,261,155 A 4/1981 Glib
4,283,892 A 8/1981 Brown
4,330,971 A 5/1982 Auberger
4,353,664 A 10/1982 Gilb
4,411,548 A * 10/1983 Tschan ..... E04B 1/2612 403/232.1
4,422,792 A 12/1983 Gilb
4,423,977 A 1/1984 Gilb
4,455,805 A 6/1984 Rionda et al.
4,480,941 A 11/1984 Glib
4,498,801 A 2/1985 Gilb
4,527,375 A 7/1985 Braginetz
4,555,887 A 12/1985 Rionda et al.
4,561,230 A 12/1985 Rionda et al.
4,717,279 A 1/1988 Commins
4,764,069 A 8/1988 Reinwall et al.
4,827,684 A 5/1989 Allan
4,841,690 A 6/1989 Commins
4,893,961 A 1/1990 O'Sullivan et al.
4,920,725 A * 5/1990 Gore ..... E04B 1/2612 403/232.1
4,949,929 A 8/1990 Kesselman et al.
4,957,186 A 9/1990 Reetz
4,982,548 A * 1/1991 Abbey ..... E04B 1/0007 403/232.1
5,054,755 A 10/1991 Hawkes
5,058,358 A * 10/1991 Stratton ..... E04B 1/2612 248/214
5,071,280 A 12/1991 Turner
5,104,252 A * 4/1992 Colonias ..... E04B 1/2612 403/230
5,111,632 A 5/1992 Turner
5,201,156 A 4/1993 Newman
5,228,261 A 7/1993 Watkins
5,240,342 A 8/1993 Kresa, Jr.
5,394,668 A 3/1995 Lim
5,437,137 A 8/1995 Allen
2,717,801 A * 9/1995 Neil ..... E04G 21/16 212/234
5,551,135 A 9/1996 Powers, III
5,555,694 A * 9/1996 Commins ..... E04B 1/2612 248/300
5,564,248 A * 10/1996 Callies ..... E04B 1/2612 403/232.1
5,598,680 A 2/1997 Wilhelmi
5,603,580 A * 2/1997 Leek ..... E04B 1/2612 403/168
5,625,995 A 5/1997 Martin
5,657,596 A 8/1997 Powers, III
5,692,864 A 12/1997 Powell et al.
5,740,643 A 4/1998 Huntley
5,755,070 A 5/1998 Hohmann
5,778,625 A 7/1998 Druffel
5,829,216 A * 11/1998 Newcomb ..... E04F 13/0807 52/167.1
5,836,131 A 11/1998 Viola et al.
6,079,176 A 6/2000 Westra
6,123,745 A 9/2000 Hess, III
6,131,358 A * 10/2000 Wise ..... E04B 1/2612 52/289
6,254,306 B1 7/2001 Williams
6,295,773 B1 10/2001 Alty
6,397,552 B1 6/2002 Bourque
6,427,391 B1 8/2002 Lyons
6,463,711 B1 * 10/2002 Callies ..... E04B 1/2612 403/232.1
6,523,321 B1 2/2003 Leek et al.
6,662,511 B1 12/2003 Alty
6,817,157 B2 11/2004 Bourque
6,877,291 B2 * 4/2005 Shamroukh ..... E04B 7/022 403/232.1
6,945,004 B1 9/2005 Ghiringhelli
7,243,464 B1 * 7/2007 Crowell ..... E02D 27/01 52/262
7,254,926 B2 8/2007 Eldeen
7,334,372 B2 * 2/2008 Evans ..... E04B 1/2612 52/289
7,343,712 B2 3/2008 Shelton
7,448,178 B2 11/2008 Visone
7,461,494 B2 12/2008 Frezza
7,882,665 B2 * 2/2011 Kawai ..... E04B 1/08 52/204.2
7,905,067 B2 * 3/2011 Schiffmann ..... B29C 70/443 52/169.9
7,971,409 B2 7/2011 Bak et al.
8,051,620 B2 11/2011 Kittlitz et al. ..... E04B 1/2612 52/289
8,250,827 B2 * 8/2012 Lin et al. ..... 52/702
8,322,096 B2 * 12/2012 Visser ..... 52/289
8,387,333 B2 3/2013 Brekke
8,720,155 B1 * 5/2014 Robell ..... E04B 1/2612 52/289
8,966,857 B2 3/2015 Pope et al.
9,115,489 B2 8/2015 Boudon
9,206,594 B1 12/2015 Grievous
9,228,338 B2 1/2016 Lin
9,394,680 B2 7/2016 Bundy et al.
10,024,049 B2 7/2018 Brekke
10,179,992 B2 1/2019 Brekke
10,184,242 B2 1/2019 Brekke
10,260,232 B1 4/2019 Conboy
10,316,510 B2 6/2019 Brekke et al.
10,358,812 B2 7/2019 Jensen
10,653,904 B2 5/2020 Conboy
10,814,150 B2 10/2020 Conboy
10,899,038 B2 1/2021 Conboy
11,021,867 B2 6/2021 Brekke et al.
2001/0054270 A1 12/2001 Rice
2002/0078656 A1 * 6/2002 Leek ..... E04B 1/2612 52/702
2003/0009980 A1 * 1/2003 Shahnazarian ..... E04B 1/2608 52/712
2004/0129845 A1 * 7/2004 Whale ..... E04B 1/2612 248/201
2005/0120669 A1 * 6/2005 Harrison ..... E04B 1/2612 52/698
2005/0155307 A1 * 7/2005 Timony ..... E04B 1/2612 52/506.01
2006/0130414 A1 * 6/2006 Walther ..... E04B 1/003 52/289
2006/0191233 A1 8/2006 Tamlyn
2007/0119108 A1 * 5/2007 Downard ..... E04B 1/2604 52/289
2007/0294979 A1 * 12/2007 Lin ..... E04B 1/2612 52/702
2008/0101855 A1 * 5/2008 Lin ..... E04B 1/2612 403/232.1
2008/0237421 A1 10/2008 Szpotowski
2008/0256884 A1 * 10/2008 Clarizia ..... E04B 1/2612 52/309.3
2008/0282633 A1 * 11/2008 Buckholt ..... E04B 1/78 52/309.8
2009/0113839 A1 * 5/2009 Carr ..... E04B 1/2612 52/712
2010/0031601 A1 * 2/2010 Lin ..... E04B 1/2612 52/712
2010/0064626 A1 3/2010 Kittlitz et al.

(56) References Cited

U.S. PATENT DOCUMENTS

| | | | | |
|---|---|---|---|---|
| 2010/0125996 | A1* | 5/2010 | Coffman, Jr. | B25C 3/008 29/283 |
| 2011/0146173 | A1* | 6/2011 | Visser | E04B 1/26 52/268 |
| 2012/0137612 | A1* | 6/2012 | Buckholt | E04B 1/944 52/309.4 |
| 2013/0067850 | A1* | 3/2013 | Sasanecki | E04B 1/2612 52/702 |
| 2014/0338282 | A1 | 11/2014 | Sidhu | |
| 2015/0184370 | A1* | 7/2015 | Brekke | E04B 1/2612 52/708 |

FOREIGN PATENT DOCUMENTS

| | | | |
|---|---|---|---|
| EP | 1672133 | A2 | 6/2006 |
| EP | 1995388 | | 11/2008 |
| EP | 2607561 | A3 | 7/2013 |
| ES | 2224819 | | 10/2002 |
| FR | 2609742 | | 7/1988 |
| GB | 185694 | | 9/1922 |
| GB | 185694 | A | 9/1922 |
| GB | 574457 | | 1/1946 |
| GB | 678979 | | 9/1952 |
| GB | 726794 | | 3/1955 |
| GB | 2397829 | | 8/2004 |
| GB | 2452492 | A | 3/2009 |
| GB | 2472692 | A | 2/2011 |
| GB | 2443483 | B | 9/2011 |
| JP | 1991014482 | | 3/1991 |
| JP | H 3206225 | | 9/1991 |
| JP | H 519406 | U | 3/1993 |
| JP | 1995229225 | | 8/1995 |
| JP | 2515383 | | 10/1996 |
| JP | 2537712 | | 6/1997 |
| JP | 10088668 | | 4/1998 |
| JP | H 10140704 | | 5/1998 |
| JP | 10-159182 | | 6/1998 |
| JP | 1162253 | A | 3/1999 |
| JP | 2941921 | | 6/1999 |
| JP | 2000-96739 | | 4/2000 |
| JP | B0003964051 | | 6/2007 |
| JP | 2014173379 | | 9/2014 |
| WO | WO 2008/035098 | A2 | 3/2008 |
| WO | WO 2011/033289 | A1 | 3/2011 |

OTHER PUBLICATIONS

*Columbia Insurance Co. et al.* v. *Simpson Strong-Tie Company, Inc.*, Case No. 3:19-cv-04683, Order Denying Plaintiff's Motion for Preliminary Injunction, filed in the case on Oct. 4, 2019, 20 pages.

*Columbia Insurance Co. et al.* v. *Simpson Strong-Tie Company, Inc.*, Case No. 3:19-cv-04683, Reply in Support of Plaintiffs' Notice of Motion and Motion for Preliminary Injunction, Memorandum of Points and Authorities in Support of Motion, filed in the case on Sep. 13, 2019, 18 pages.

*Columbia Insurance Co. et al.* v. *Simpson Strong-Tie Company, Inc.*, Case No. 3:19-cv-04683, Answer, Affirmative Defenses, and Counterclaim to Complaint for Patent Infringement, filed in the case on Sep. 3, 2019, 8 pages.

*Columbia Insurance Co. et al.* v. *Simpson Strong-Tie Company, Inc.*, Case No. 3:19-cv-04683, Memorandum of Points and Authorities in Opposition to Motion for Preliminary Injunction, filed in the case on Sep. 5, 2019, 31 pages.

*Columbia Insurance Co. et al.* v. *Simpson Strong-Tie Company, Inc.*, Case No. 3:19-cv-04683, Declaration of W. Andrew Fennell in Support of Opposition to Motion for Preliminary Injunction, filed in the case on Sep. 5, 2019, 91 pages.

*Columbia Insurance Co. et al.* v. *Simpson Strong-Tie Company, Inc.*, Case No. 3:19-cv-04683, Declaration of Sam Hensen in Support of Opposition to Motion for Preliminary Injunction, filed in the case on Sep. 5, 2019, 8 pages.

*Columbia Insurance Co. et al.* v. *Simpson Strong-Tie Company, Inc.*, Case No. 3:19-cv-04683, Investigation of U.S. Appl. No. 16/225,517, Exhibit A to Declaration of W. Andrew Fennel in Support of Opposition to Motion for Preliminary Injunction, filed in the case on Sep. 5, 2019, 11 pages.

*Columbia Insurance Co. et al.* v. *Simpson Strong-Tie Company, Inc.*, Case No. 3:19-cv-04683, Declaration of Joseph V. Mauch in Support of Opposition to Motion for Preliminary Injunction, filed in the case on Sep. 5, 2019, 4 pages.

*Columbia Insurance Co. et al.* v. *Simpson Strong-Tie Company, Inc.*, Case No. 3:19-cv-04683, Invalidity Claim Chart, U.S. Pat. No. 10,316,510, Exhibit E to Declaration of Joseph V. Mauch in Support of Opposition to Motion for Preliminary Injunction, filed in the case on Sep. 5, 2019, 30 pages.

*Columbia Insurance Co. et al.* v. *Simpson Strong-Tie Company, Inc.*, Case No. 3:19-cv-04683, Invalidity Claim Chart, U.S. Pat. No. 10,316,510, Exhibit F to Declaration of Joseph V. Mauch in Support of Opposition to Motion for Preliminary Injunction, filed in the case on Sep. 5, 2019, 30 pages.

*Columbia Insurance Co. et al.* v. *Simpson Strong-Tie Company, Inc.*, Case No. 3:19-cv-04683, Invalidity Claim Chart, U.S. Pat. No. 10,316,510, Exhibit G to Declaration of Joseph V. Mauch in Support of Opposition to Motion for Preliminary Injunction, filed on Sep. 5, 2019, 32 pages.

*Columbia Insurance Co. et al.* v. *Simpson Strong-Tie Company, Inc.*, Case No. 3:19-cv-04683, Invalidity Claim Chart, U.S. Pat. No. 10,316,510, Exhibit H to Declaration of Joseph V. Mauch in Support of Opposition to Motion for Preliminary Injunction, filed in the case on Sep. 5, 2019, 32 pages.

*Columbia Insurance Co. et al.* v. *Simpson Strong-Tie Company, Inc.*, Case No. 3:19-cv-04683, Complaint for Patent Infringement, filed in the case on Aug. 12, 2019, 6 pages.

*Simpson Strong-Tie Company, inc.* v. *Columbia Insurance Company*, Case No. PGR2019-00063, Exhibit 1035, Minutes of Telephonic Meeting Held on Jan. 30, 2020, filed on Jan. 30, 2020, 29 pages.

*Simpson Strong-Tie Company, inc.* v. *Columbia Insurance Company*, Case No. PGR2019-00063, Exhibit 1036, Supplemental Declaration W. Andrew Fennell in Support of Petitioner's Reply to Patent Owner's Preliminary Response, filed on Feb. 10, 2020, 6 pages.

*Simpson Strong-Tie Company, inc.* v. *Columbia Insurance Company*, Case No. PGR2019-00063, Exhibit 1038, of Dr. Serette Deposition Transcript, in Support of Petitioner's Reply to Patent Owner's Preliminary Response, filed on Jul. 20, 2020, 272 pages.

*Simpson Strong-Tie Company, inc.* v. *Columbia Insurance Company*, Case No. PGR2019-00063, Exhibit 1039, Fennell Declaration, in Support of Petitioner's Reply to Patent Owner's Preliminary Response, filed on Aug. 27, 2020, 28 pages.

*Simpson Strong-Tie Company, inc.* v. *Columbia Insurance Company*, Case No. PGR2019-00063, Exhibit 1040, American Heritage Dictionary, Definition, filed on Aug. 27, 2020, 7 pages.

*Simpson Strong-Tie Company, inc.* v. *Columbia Insurance Company*, Case No. PGR2019-00063, Exhibit 1042, Declaration of W. Andrew Fennell in Support of Petitioner's Reply and Opposition to Patent Owner's Revised Contingent Motion to Amend, filed on Nov. 19, 2020, 31 pages.

*Simpson Strong-Tie Company, inc.* v. *Columbia Insurance Company*, Case No. PGR2019-00063, Exhibit 1043, Blank Rendering of Tsukamoto Reference, filed on Nov. 19, 2020, 1 page.

*Simpson Strong-Tie Company, inc.* v. *Columbia Insurance Company*, Case No. PGR2019-00063, Exhibit 1044, Deposition of Dr. Reynaud Serette, filed on Dec. 22, 2020, 116 pages.

*Simpson Strong-Tie Company, inc.* v. *Columbia Insurance Company*, Case No. PGR2019-00063, Exhibit 1045, Petitioner's Demonstratives for Oral argument, filed on Jan. 14, 2021, 77 pages.

*Simpson Strong-Tie Company, inc.* v. *Columbia Insurance Company*, Case No. PGR2019-00063, Exhibit 2001, Declaration of Dr. Reynaud Serette in Support of Patent Owner's Preliminary Response, filed on Dec. 13, 2019, 124 pages.

(56) References Cited

OTHER PUBLICATIONS

*Simpson Strong-Tie Company, inc.* v. *Columbia Insurance Company*, Case No. PGR2019-00063, Exhibit 2002, Curriculum Vitae of Reynaud L. Serette, Ph.D. in Support of Patent Owner's Preliminary Response, filed on Dec. 13, 2019, 15 pages.
*Simpson Strong-Tie Company, inc.* v. *Columbia Insurance Company*, Case No. PGR2019-00063, Exhibit 2015, American Institute of Timper Construction Manual, Fourth Edition, 1994, in Support of Patent Owner's Preliminary Response, filed on Dec. 13, 2019, 17 pages.
*Simpson Strong-Tie Company, inc.* v. *Columbia Insurance Company*, Case No. PGR2019-00063, Exhibit 2016, International Code Council, International Building Code, 2012, in Support of Patent Owner's Preliminary Response, filed on Dec. 13, 2019, 60 pages.
*Simpson Strong-Tie Company, inc.* v. *Columbia Insurance Company*, Case No. PGR2019-00063, Exhibit 2018, MiTek, Fire Wall Hangers FWH Series, Structural Connectors Specification Sheet, 2019, in Support of Patent Owner's Preliminary Response, filed on Dec. 13, 2019, 2 pages.
*Simpson Strong-Tie Company, inc.* v. *Columbia Insurance Company*, Case No. PGR2019-00063, Exhibit 2019, Simpson Strong-Tie, DU/DHU/DHUTF Drywall Hangers Specification Sheet, in Support of Patent Owner's Preliminary Response, filed on Dec. 13, 2019, 4 pages.
*Simpson Strong-Tie Company, inc.* v. *Columbia Insurance Company*, Case No. PGR2019-00063, Exhibit 2021, ICC-ES Evaluation Report, Mar. 2019, in Support of Patent Owner's Preliminary Response, filed on Dec. 13, 2019, 18 pages.
*Simpson Strong-Tie Company, inc.* v. *Columbia Insurance Company*, Case No. PGR2019-00063, Exhibit 2022, Definition From, The New Oxford Dictionary, Second Edition, 2005, in Support of Petitioner's Reply to Patent Owner's Preliminary Response, filed on Dec. 13, 2019, 4 pages.
*Simpson Strong-Tie Company, inc.* v. *Columbia Insurance Company*, Case No. PGR2019-00063, Exhibit 2023, Gypsum Association, Gypsum Panel Products Types, Uses, Sizes, and Standards, 2004, in Support of Patent Owner's Preliminary Response, filed on Dec. 13, 2019, 2 pages.
*Simpson Strong-Tie Company, inc.* v. *Columbia Insurance Company*, Case No. PGR2019-00063, Exhibit 2024, PABCO Gypsum, For Those About to Rock PABCO Gypsum Products, in Support of Patent Owner's Preliminary Response, filed on Dec. 13, 2019, 8 pages.
*Simpson Strong-Tie Company, inc.* v. *Columbia Insurance Company*, Case No. PGR2019-00063, Exhibit 2025, Beall, C., "Fire Ratings of Masonry Walls," 1989, in Support of Patent Owner's Preliminary Response, filed on Dec. 13, 2019, 3 pages.
*Simpson Strong-Tie Company, inc.* v. *Columbia Insurance Company*, Case No. PGR2019-00063, Exhibit 2026, Bilow, D. N., et al., "Fire and Concrete Structures," 2008, in Support of Patent Owner's Preliminary Response, filed on Dec. 13, 2019, 10 pages.
*Simpson Strong-Tie Company, inc.* v. *Columbia Insurance Company*, Case No. PGR2019-00063, Exhibit 2027, Irish Concrete Federation, Comprehensive Fire Protection and Safety with Concrete, Dec. 2007, in Support of Patent Owner's Preliminary Response, filed on Dec. 13, 2019, 33 pages.
*Simpson Strong-Tie Company, inc.* v. *Columbia Insurance Company*, Case No. PGR2019-00063, Exhibit 2028, Montgomery Township Department of Planning and Zoning, Basement Finish/Remodel Code, 2009, in Support of Patent Owner's Preliminary Response, filed on Dec. 13, 2019, 5 pages.
*Simpson Strong-Tie Company, inc.* v. *Columbia Insurance Company*, Case No. PGR2019-00063, Exhibit 2029, Township of Hillsborough, Sample Guide for Finish Basement Requirements in Existing One and Two Family Dwellings, Jan. 30, 2021, in Support of Patent Owner's Preliminary Response, filed on Dec. 13, 2019, 5 pages.
*Simpson Strong-Tie Company, inc.* v. *Columbia Insurance Company*, Case No. PGR2019-00063, Exhibit 2030, Lstiburek, J., "Understanding Basements," Building Science Digest 103, in Support of Patent Owner's Preliminary Response, filed on Dec. 13, 2019, 18 pages.
*Simpson Strong-Tie Company, inc.* v. *Columbia Insurance Company*, Case No. PGR2019-00063, Exhibit 2031, Moisture Control in Buildings: The Key Factor in Mod Prevention, 2nd Edition, 2009, in Support of Patent Owner's Preliminary Response, filed on Dec. 13, 2019, 67 pages.
*Simpson Strong-Tie Company, inc.* v. *Columbia Insurance Company*, Case No. PGR2019-00063, Exhibit 2032, U.S, Department of Agriculture, Forest Service, Wood-Frame House Construction, Agriculture Handbook No. 73, Apr. 1975, in Support of Patent Owner's Preliminary Response, filed on Dec. 13, 2019, 12 pages.
*Simpson Strong-Tie Company, inc.* v. *Columbia Insurance Company*, Case No. PGR2019-00063, Exhibit 2033, CEL Consulting, Inc., Testing of Joist Hangers perAC13 "Acceptance Criteria for Joist Hangers and Similar Devices," in Support of Patent Owner's Preliminary Response, filed on Dec. 13, 2019, 17 pages.
*Simpson Strong-Tie Company, inc.* v. *Columbia Insurance Company*, Case No. PGR2019-00063, Exhibit 2034, Supplemental Declaration of Dr. Reynaud Serette in Support of Patent Owner's Sur-Reply, filed on Feb. 19, 2020, 5 pages.
*Simpson Strong-Tie Company, inc.* v. *Columbia Insurance Company*, Case No. PGR2019-00063, Exhibit 2035, Trimber, K.A., et al., "Measuring Moisture in Walls," Interface, Apr. 2012, in Support of Patent Owner's Sur-Reply, filed on Feb. 19, 2020, 8 pages.
*Simpson Strong-Tie Company, inc.* v. *Columbia Insurance Company*, Case No. PGR2019-00063, Exhibit 2036, U.S. Department of Housing and Urban Development and Research, Building Concrete Masonry Homes: Design and Construction Issues, in Support of Patent Owner's Sur-Reply, filed on Feb. 19, 2020, 43 pages.
*Simpson Strong-Tie Company, inc.* v. *Columbia Insurance Company*, Case No. PGR2019-00063, Exhibit 2037, CGC Inc., The Gypsum Construction Handbook, Centennial Edition, 2005, in Support of Patent Owner's Sur-Reply, filed on Feb. 19, 2020, 34 pages.
*Simpson Strong-Tie Company, inc.* v. *Columbia Insurance Company*, Case No. PGR2019-00063, Exhibit 2038, Clarkwestern Dietrich Building Systems Furring Channel Hat Channel, in Support of Patent Owner's Sur-Reply, filed on Feb. 19, 2020, 3 pages.
*Simpson Strong-Tie Company, inc.* v. *Columbia Insurance Company*, Case No. PGR2019-00063, Exhibit 2039, ASTM International Standard Specification for Testing and Establishing Allowable Loads of Joist Hangers, Designation: D7147-11, in Support of Patent Owner's Sur-Reply, filed on Feb. 19, 2020, 10 pages.
*Simpson Strong-Tie Company, inc.* v. *Columbia Insurance Company*, Case No. PGR2019-00063, Exhibit 2040, APA, Floor Construction Guide, Dec. 2019, in Support of Patent Owner's Sur-Reply, filed on Feb. 19, 2020, 16 pages.
*Simpson Strong-Tie Company, inc.* v. *Columbia Insurance Company*, Case No. PGR2019-00063, Exhibit 2041, International Code Council, 2012 International Building Code, 2011, in Support of Patent Owner's Sur-Reply, filed on Feb. 13, 2020, 17 pages.
*Simpson Strong-Tie Company, inc.* v. *Columbia Insurance Company*, Case No. PGR2019-00063, Exhibit 2042, Supplemental Declaration of Dr. Reynaud Serette in Support of Patent Owner's Sur-Reply, filed on Feb. 26, 2020, 5 pages.
*Simpson Strong-Tie Company, inc.* v. *Columbia Insurance Company*, Case No. PGR2019-00063, Exhibit 2043, Videoconference Deposition of W. Andrew Fennell filed on Jun. 4, 2020, 61 pages.
*Simpson Strong-Tie Company, inc.* v. *Columbia Insurance Company*, Case No. PGR2019-00063, Exhibit 2044, Third Supplemental Declaration of Dr. Reynaud Serette, filed on Jun. 4, 2020, 44 pages.
*Simpson Strong-Tie Company, inc.* v. *Columbia Insurance Company*, Case No. PGR2019-00063, Exhibit 2045, International Code Council, 2012 International Building Code, 2011, filed on Jun. 4, 2020, 6 pages.
*Simpson Strong-Tie Company, inc.* v. *Columbia Insurance Company*, Case No. PGR2019-00063, Exhibit 2046, Buchanan, A. H., Structural Design for Fire Safety, 2001, filed on Jun. 4, 2020, 99 pages.

(56) References Cited

OTHER PUBLICATIONS

*Simpson Strong-Tie Company, inc.* v. *Columbia Insurance Company*, Case No. PGR2019-00063, Exhibit 2047, ASTIM International, Standard Test Methods for Fire Tests of Building Construction and Materials, E119-19, filed on Jun. 4, 2020, 37 pages.
*Simpson Strong-Tie Company, inc.* v. *Columbia Insurance Company*, Case No. PGR2019-00063, Exhibit 2048, American Wood Council, Calculating the Fire Resistance of Exposed Wood members, Technical Report 10, American Forest & Paper Association , filed on Jun. 4, 2020, 55 pages.
*Simpson Strong-Tie Company, inc.* v. *Columbia Insurance Company*, Case No. PGR2019-00063, Exhibit 2049, New Oxford American Dictionary, Second Edition, Definition of "through", filed on Jun. 4, 20202, 4 pages.
*Simpson Strong-Tie Company, inc.* v. *Columbia Insurance Company*, Case No. PGR2019-00063, Exhibit 2050, McEntee, P., "What You Should Know About the New DGH Fire Wall Hanger Options," Feb. 2018, filed on Jun. 4, 2020, 3 pages.
*Simpson Strong-Tie Company, inc.* v. *Columbia Insurance Company*, Case No. PGR2019-00063, Exhibit 2054, Sheet Metal Stamping 101 Parts l-V, filed on Oct. 8, 2020, 39 pages.
*Simpson Strong-Tie Company, inc.* v. *Columbia Insurance Company*, Case No. PGR2019-00063, Exhibit 2055, Declaration of Dr. Reynaud Serette in Support of the Revised Contingent Motion to Amend, filed on Oct. 7, 2020, 12 pages.
*Simpson Strong-Tie Company, inc.* v. *Columbia Insurance Company*, Case No. PGR2019-00063, Exhibit 2056, ANSI/AISC 360-10 Specification for Structural Steel Building, Jun. 22, 2011, filed on Dec. 10, 2020, 35 pages.
*Simpson Strong-Tie Company, inc.* v. *Columbia Insurance Company*, Case No. PGR2019-00063, Exhibit 2057, Declaration of Dr. Reynaud Serette in Support of the Reply to the Opposition to the Revised Contingent Motion to Amend, filed on Dec. 10, 2020, 57 pages.
*Simpson Strong-Tie Company, inc.* v. *Columbia Insurance Company*, Case No. PGR2019-00063, Exhibit 2058, Patent Owner's Notice of Submission of Demonstrative Exhibits for Jan. 14, 2021 Oral Hearing, filed on Jan. 11, 2021, 83 pages.
*Simpson Strong-Tie Company, inc.* v. *Columbia Insurance Company*, Case No. PGR2019-00063, Decision Granting Institution of Post-Grant Review, filed on Mar. 12, 2020, 63 pages.
*Simpson Strong-Tie Company, inc.* v. *Columbia Insurance Company*, Case No. PGR2019-00063, Final Written Decision, filed on Mar. 1, 2021, 143 pages.
*Simpson Strong-Tie Company, inc.* v. *Columbia Insurance Company*, Case No. PGR2019-00063, Patent Owner's Contingent Motion to Amend Under 37 C.F.R. Section 42.221, filed on Jun. 4, 2020, 41 pages.
*Simpson Strong-Tie Company, inc.* v. *Columbia Insurance Company*, Case No. PGR2019-00063, Patent Owner's Corrected Sur-Reply, filed on Mar. 33, 2020, 9 pages.
*Simpson Strong-Tie Company, inc.* v. *Columbia Insurance Company*, Case No. PGR2019-00063, Patent Owner's Preliminary Response to the Petition for Post Grant Review, filed on Dec. 13, 2019, 120 pages.
*Simpson Strong-Tie Company, inc.* v. *Columbia Insurance Company*, Case No. PGR2019-00063, Patent Owner's Reply in Support of Its Revised Motion to Amend, filed on Dec. 10, 2020, 21 pages.
*Simpson Strong-Tie Company, inc.* v. *Columbia Insurance Company*, Case No. PGR2019-00063, Patent Owner's Response to the Petition for Post Grant Review, filed on Jun. 4, 2020, 115 pages.
*Simpson Strong-Tie Company, inc.* v. *Columbia Insurance Company*, Case No. PGR2019-00063, Patent Owner's Sur-Reply, filed on Feb. 20, 2020, 10 pages.
*Simpson Strong-Tie Company, inc.* v. *Columbia Insurance Company*, Case No. PGR2019-00063, Patent Owner's Sur-Reply, filed on Oct. 8, 2020, 37 pages.
*Simpson Strong-Tie Company, inc.* v. *Columbia Insurance Company*, Case No. PGR2019-00063, Petitioner Simpson Strong-Tie, Inc.'s Opposition to Patent Owners Contingent Motion to Amend, filed on Aug. 27, 2020, 30 pages.
*Simpson Strong-Tie Company, inc.* v. *Columbia Insurance Company*, Case No. PGR2019-00063, Petitioner Simpson Strong-Tie, Inc.'s Reply to Patent Owner's Preliminary Response, filed on Feb. 2, 2020, 9 pages.
*Simpson Strong-Tie Company, inc.* v. *Columbia Insurance Company*, Case No. PGR2019-00063, Petitioner Simpson Strong-Tie, Inc.'s Reply to Patent Owner's Response, filed on Aug. 27, 2020, 35 pages.
*Simpson Strong-Tie Company, inc.* v. *Columbia Insurance Company*, Case No. PGR2019-00063, Petitioner's Sur-Reply to Patent Owner's Reply to Petitioner's Opposition to Patent Owner's Revised Contingent Motion to Amend, filed on Dec. 31, 2020, 17 pages.
*Simpson Strong-Tie Company, inc.* v. *Columbia Insurance Company*, Case No. PGR2019-00063, Petitioner Simpson Strong-Tie Company, Inc.'s Opposition to Patent Owner's Revised Contingent Motion to Amend, filed on Nov. 19, 2020, 31 pages.
*Simpson Strong-Tie Company, inc.* v. *Columbia Insurance Company*, Case No. PGR2019-00063, Preliminary Guidance Patent Owner's Motion to Amend, filed on Sep. 21, 2020, 12 pages.
*Simpson Strong-Tie Company, inc.* v. *Columbia Insurance Company*, Case No. PGR2019-00063, Patent Owner's Revised Motion to Amend, filed on Oct. 8, 2020, 43 pages.
*Simpson Strong-Tie Company, inc.* v. *Columbia Insurance Company*, Case No. PGR2019-00063, Exhibit 2017, International Code Council, International Building Code, 2000, in Support of Patent Owner's Preliminary Response, filed on Dec. 13, 2019, 60 pages.
*Simpson Strong-Tie Company, inc.* v. *Columbia Insurance Company*, Case No. PGR2019-00063, Exhibit 2051, Memorandum of Points and Authorities in Opposition to Motion for Preliminary Injunction, in Support of Patent Owner's Response to the Petition for Post Grant Review, filed on Dec. 13, 2019, 60 pages.
*Simpson Strong-Tie Company, inc.* v. *Columbia Insurance Company*, Case No. PGR2019-00063, Patent Owner's Revised Contingent Motion to Amend, filed on Oct. 8, 2020, 43 pages.
Installer's Pocket Guide, Simpson Strong-Tie Company, Inc. (2009), pp. 60.
Top-Flange Joist Hangers Installed on Walls Over Wood Structural Panel Sheathing or Drywall, Technical Bulletin, Simpson Strong-Tie Company, Inc. (2013), pp. 2.
S/LBV/S/B and S/BA Hangers, Cold-Formed Steel Connectors for Residential and Mid-Rise Constructions (CC-CFS10, Simpson Strong-Tie Company, Inc. (2010), p. 57, front and back cover, Simpson Strong-Tie Company, lnc.(2010), pp. 3.
Cold-Formed Steel Connectors for Residential and Mid-Rise Construction (C-CFS10), Simpson Strong-Tie Company, Inc. (2010), pp. 76.
Wood Construction Connectors Catalog 2013-2014 (C-2013), Simpson Strong-Tie Company, Inc., pp. 235.
Petition for Post Grant Review of U.S. Pat. No. 10,316,510, dated Sep. 5, 2019, 152 pages.
Petition for Post Grant Review of U.S. Pat. No. 10,316,510, Exhibit 1003, Declaration of W. Andrew Fennell in Support of Petition for Post-Grant Review, dated Sep. 5, 2019, 172 pages.
Petition for Post Grant Review of U.S. Pat. No. 10,316,510, Exhibit 1004, Curriculum Vitae of W. Andrew Fennell, dated Sep. 5, 2019, 6 pages.
Petition for Post Grant Review of U.S. Pat. No. 10,316,510, Exhibit 1016, Fire-Rated Assemblies in Commercial Construction, in Support of Petition for Post-Grant Review, May 2014, 106 pages.
Petition for Post Grant Review of U.S. Pat. No. 10,316,510, Exhibit 1017, Fire Resistance Design Manual Sound Control, in Support of Petition for Post-Grant Review, Jun. 2012, 230 pages.
Petition for Post Grant Review of U.S. Pat. No. 10,316,510, Exhibit 1018, International Building Code, in Support of Petition for Post-Grant Review, May 2011, 12 pages.
Petition for Post Grant Review of U.S. Pat. No. 10,316,510, Exhibit 1030, Stainless steel for durability, fire-resistance and safety, in Support of Petition for Post-Grant, 8 pages.

(56) References Cited

OTHER PUBLICATIONS

Petition for Post Grant Review of U.S. Pat. No. 10,316,510, Exhibit 1031, Infringement Claim Chart, in Support of Petition for Post-Grant Review, Aug. 2019, 20 pages.
Simpson Strong-Tie, "Wood Construction Connectors: 2013-2014", pages: front cover, 69, 78, 83, 86, 89, 91, 100, 108, 110, 118, 134, 162, back cover, C-2013, Simpson Strong-Tie Company, Inc., Pleasanton, California, USA.
Patent Cooperation Treaty (PCT), The International Search Report and The Written Opinion of the International Searching Authority, or the Declaration: PCT/US2014/070142, dated Apr. 15, 2015, 11 pages, International Searching Authority, European Patent Office, Rijswijk, The Netherlands.

* cited by examiner

DRYWALL JOIST HANGER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF INVENTION

The present invention relates to building construction and, more particularly, to a joist hanger adapted to secure a joist to a header or other support member with a first drywall panel between the back of the joist hanger and the front of the header. This allows the first drywall panel, which is relatively incombustible, to extend up far enough to cover the front surface of the header.

BACKGROUND

Joist hangers are used in building construction to secure the ends of joists or other members to headers or other support members. Typically, the joist hanger includes a u-shaped portion that receives the joist. The bottom surface of the joist rests on the seat of the hanger, and the side walls of the hanger are dimensioned to closely receive the side faces of the joist, providing it with lateral support.

Where appropriate, the joist may be connected to the hanger by means of nails driven through the side walls into the side faces of the joist. These nails may simply be driven horizontally into the joist, in which case they are preferably short nails that will not pass through the joist. Alternatively, longer nails may be used that are driven horizontally and angularly into the joist such that they are driven into the header as well. This is commonly referred to as toe-nailing. The other common way to nail the hanger to the joist is to use short nails that are driven downward at an angle into the joist only.

Often, in order to connect the joist hanger to the header, back flanges are attached to the side walls. Generally, these flanges extend laterally from the side walls, to overlap a portion of the face of the header. These flanges can extend inwardly or outwardly from the side walls, depending on design considerations.

Openings may be provided in the back flanges to receive fasteners. These fasteners are generally nails in light-frame wood construction. Screws and bolts are also used in wood construction, depending on the size of the members to be joined and other considerations. In light-gauge steel construction, sheet metal screws, bolts and rivets are commonly used.

In perhaps the simplest hangers, the back flanges extend outwardly from the side flanges, providing an easily-accessed fastening face. Fasteners are then driven though the back flanges into the header. In other instances, design considerations dictate which particular attachment method is used for attaching the joist and the hanger to the header.

In addition, top flanges may be attached to the back flanges to aid in attaching the hanger to the header. Hangers with top flanges are generally referred to as top-flange hangers. Hangers without top flanges are generally referred to as face-mount hangers. If the top flanges wrap over the top of the header and down the back of the hanger can be called a wrap-around hanger. Again, various design considerations dictate what features are present in a hanger, and various building considerations dictate which hanger, or type of hanger, is used in a particular situation. Generally, if a top flange is used and the header is made of wood, pre-formed holes with be provided in the top flanges to receive suitable fasteners for connecting the top flange to the hanger. No such fastener openings are required in steel construction because the hanger is typically fastened to the header with self-drilling sheet metal screws or by welding.

As mentioned above, it is often desirable to fasten the joist to the hanger. This is generally done to resist uplift forces acting on the joist. Such forces are often caused by lateral loading on the building due to high winds or seismic activity. Also, one end of a joist must be downwardly restrained if that joist is cantilevered (e.g., to support an overhanging deck). As mentioned above, openings may be provided in the side walls of the hanger so that the joist can be held down with fasteners driven through the openings and into the joist.

Drywall is used in barriers, but generally cannot be used to shield supporting structural members like top plates and headers because drywall is susceptible to cracking and crushing and has little bearing strength with regard to fasteners in the drywall. The present invention allows drywall to be applied to the supporting structural members, shielding them, and provides a joist hanger connection that does not damage the drywall. Importantly, the present invention does not require any alteration of the drywall or the addition of any otherwise extraneous components. The drywall can simply be applied to the front face of the supporting member, completing covering and shielding it, and the joist hanger can then be attached by driving long screws directly through the drywall and into the supporting structural member.

The present invention uses sufficiently long, thick and stiff screws that the screws can act as cooperating cantilevers, holding the hanger away from the header and against the first drywall panel without sagging. The hanger applies a sufficiently large, flat surface to the exterior drywall sheet in order to stabilize the connection without crushing the drywall either during installation (when the screws might otherwise be overdriven) or after.

SUMMARY OF THE INVENTION

The present invention provides a connection that allows a joist hanger to be attached to a supporting structural member with drywall panels interposed between them without damaging the drywall panels or compromising the strength of the connection.

The present invention provides a connection in which a joist hanger is fastened against panels that have little or no dowel bearing strength, without damage to the panels.

The present invention provides a connection in which a joist hanger is held away from the wood supporting structural member to which it is attached.

In one embodiment, the present invention provides a joist hanger that bridges the tops of the panels interposed between it and the supporting structural member, in order to form a more secure attachment thereto.

The present invention provides a joist hanger with back plate fastener openings that are all near the tops of the back plates, in particular for connection to a double 2×4 top plate.

The present invention allows panels to be placed over a supporting structural member thereby shielding it, with the top edges of the panels in which the attachment is received, reaching at least as high as the top of the structural support member.

The present invention provides a connection in which the joist hanger is connected to the supporting structural member by cantilevered screws that are only partially embedded in the structural support member.

The present invention provides a connection in which the joist hanger is formed so that no more than one fastener attaches each back plate above the adjacent side member.

The present invention provides a joist hanger that can be fastened to a structural support member through substantially non-load-bearing panels with only two screws on each side.

DESCRIPTION OF THE PREFERRED EMBODIMENT

Figure 1:
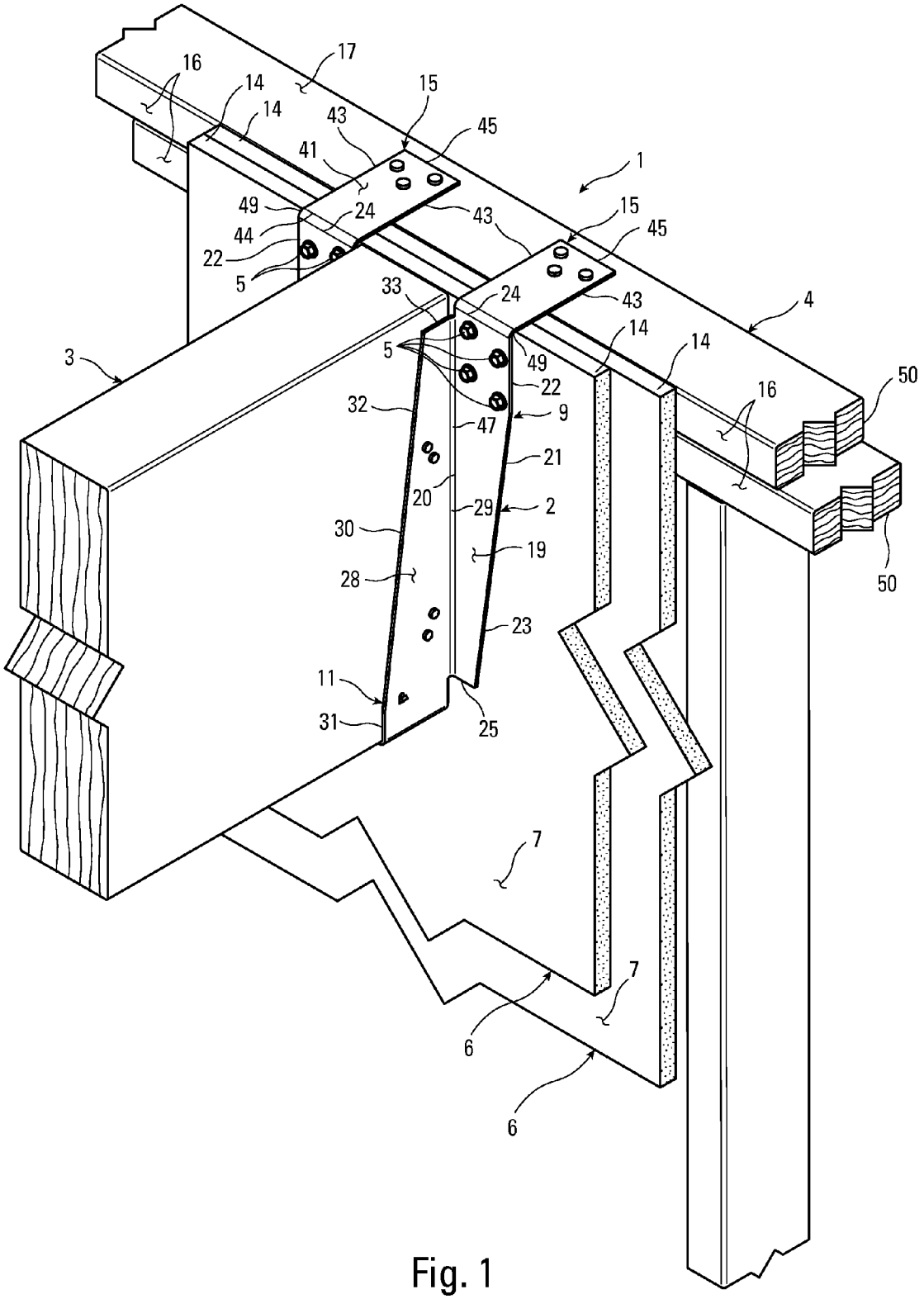
FIG. 1 is an upper right perspective view of a connection formed according to the present invention in which the joist hanger has a pair of top flanges.

As shown in FIG. 1, the invention is a connection 1 utilizing a joist hanger 2 to hang a substantially horizontal joist 3 from a wood structural support member 4 in cooperation with a first plurality of fasteners 5 and one or more substantially vertical drywall panels 6.

Preferably, the one or more drywall panels 6 shield the wood structural support member 4, and each of the one or more drywall panels 6 has a front face 7, a back face 8 opposite the front face 7, and negligible dowel bearing strength. While not shown in the drawings to show the vertically disposed studs and top plate 4 that makes up the wall, the panels 6 cover all of the structural wood members that make up the wall.

Figure 2:
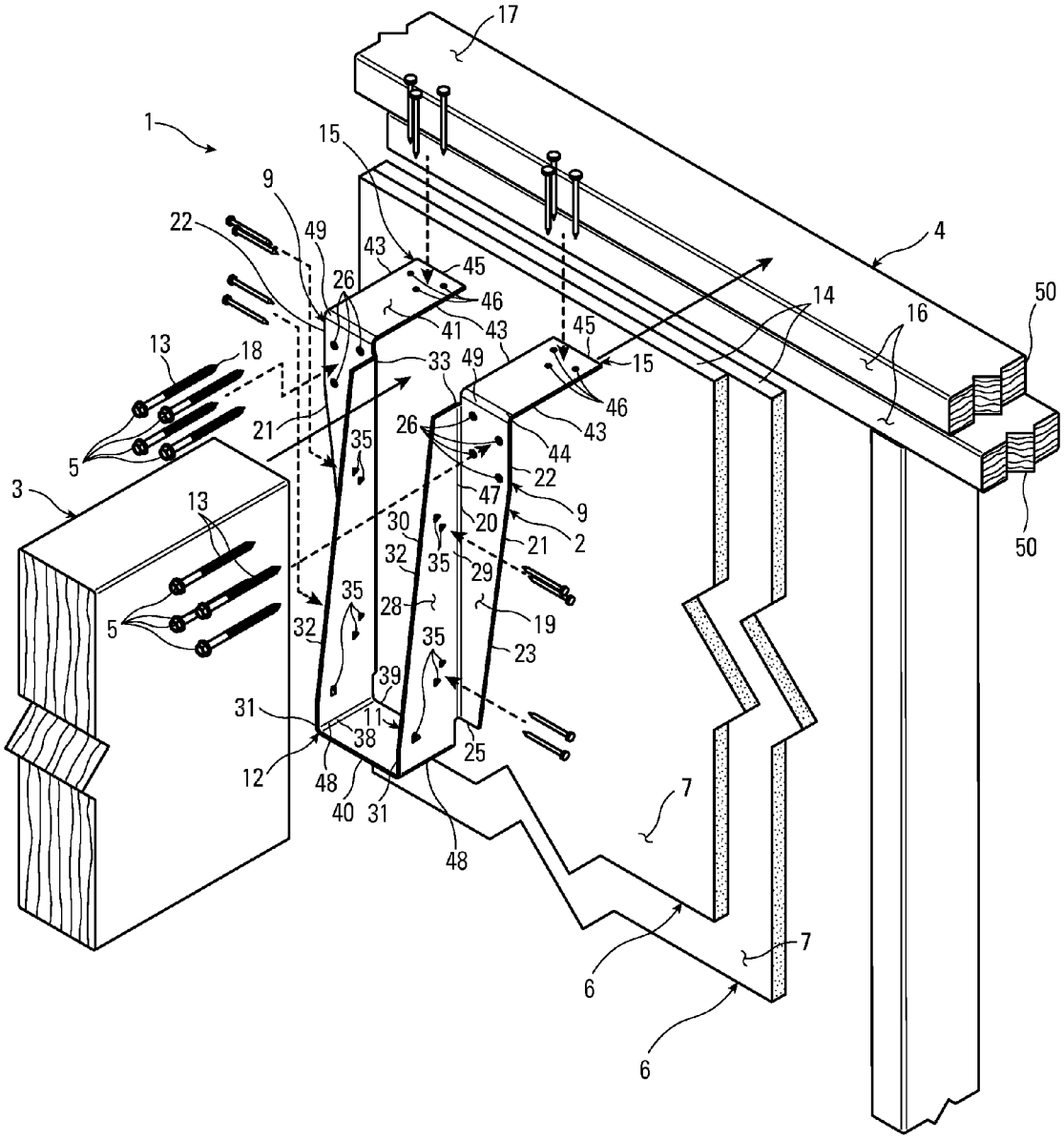
FIG. 2 is an exploded upper right perspective view of the connection shown in FIG. 1.
Figure 3:
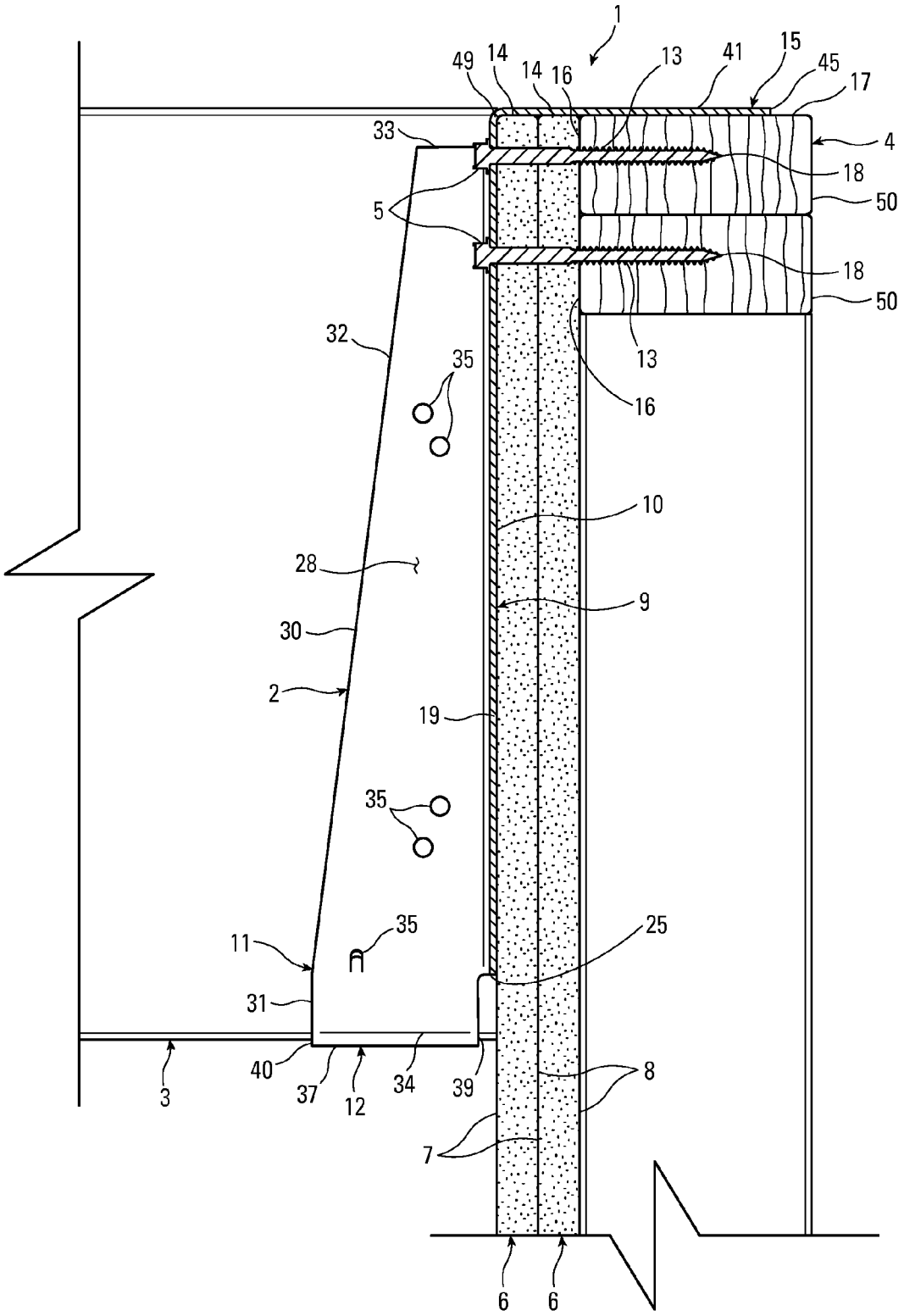
FIG. 3 is a cross-sectional right side elevation view of the connection shown in FIG. 1.

As shown in FIGS. 2 and 3, each fastener 5 preferably has a shank 13. Preferably, the structural support member 4 has a substantially vertical front face 16 and significant dowel bearing strength. The joist hanger 2 preferably supports the joist 3.

Preferably, the joist hanger 2 has a first back plate member 9, a second back plate member 9, a first side member 11, and a second side member 11.

The first back plate member 9 preferably has a first back face 10 in parallel registration with the front face 7 of a first panel 6 of the one or more panels 6. Preferably, the second back plate member 9 also has a second back face 10 in parallel registration with the front face 7 of the first panel 6 of the one or more panels 6. The first side member 11 preferably is connected to the first back plate member 9. Preferably, the second side member 11 is also connected to the second back plate member 9.

As shown in FIG. 3, at least one of the first plurality of fasteners 5 preferably passes through the first back plate member 9 and the one or more panels 6 and into the structural support member 4. Preferably, at least one of the first plurality of fasteners 5 also passes through the second back plate member 9 and the one or more panels 6 and into the structural support member 4. The joist 3 preferably is supported by the joist hanger 2. Preferably, the one or more panels 6 are between the joist hanger 2 and the structural support member 4 and the back face 8 of one panel 6 of the one or more panels 6 interfaces with the front face 16 of the structural support member 4.

The first and second back plate members 9 preferably are planar, with first and second front faces 19 opposite the first and second back faces 10, first and second inner edges 20 that preferably are linear, and first and second outer edges 21 opposite the first and second inner edges 20. The first and second outer edges 21 preferably have first and second upper substantially vertical potions 22 and first and second lower slanted portions 23 that converge downward. The first and second back plate members 9 preferably have first and second top edges 24 that are oriented up and first and second bottom edges 25 that are oriented down. The first and second back plate members 9 preferably are formed with fastener openings 26 near the first and second top edges 24. Although the back plate members 9 are shown as splayed outward in opposite direction, they could both be bent inward to face each other between the first and second side members 11, or they could both be bent in the same direction, either left or right, with one between the first and second side members 11. The joist hanger 2 of the present invention is preferably formed from light gauge sheet steel and is designed to be cut from the sheet metal blank with little waste. The embodiments of the invention shown in FIGS. 1-17 are preferably made from 12 gauge sheet steel, and the embodiment shown in FIGS. 18 and 19 that has only two fastener openings 26 in each back plate member is preferably made from 14 gauge steel.

Figure 8:
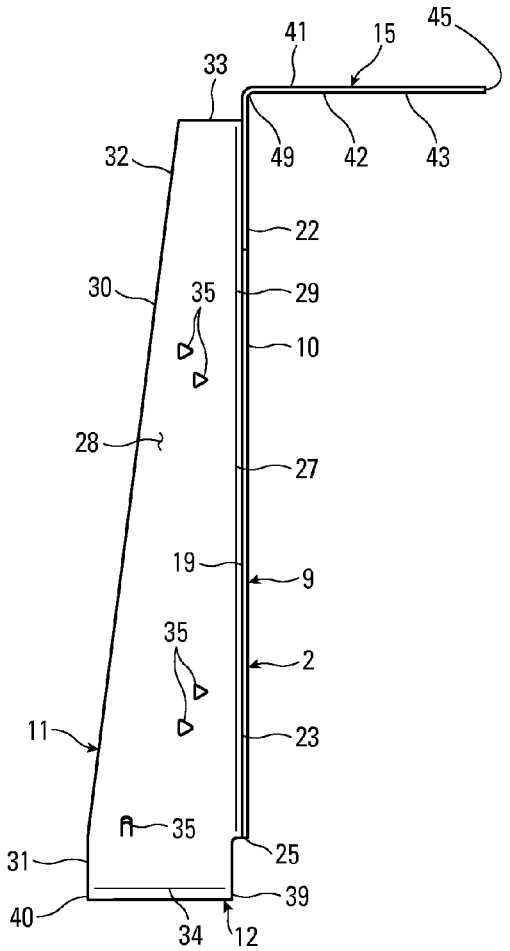
FIG. 8 is a right side elevation view of the joist hanger shown in FIG. 4.
Figure 9:
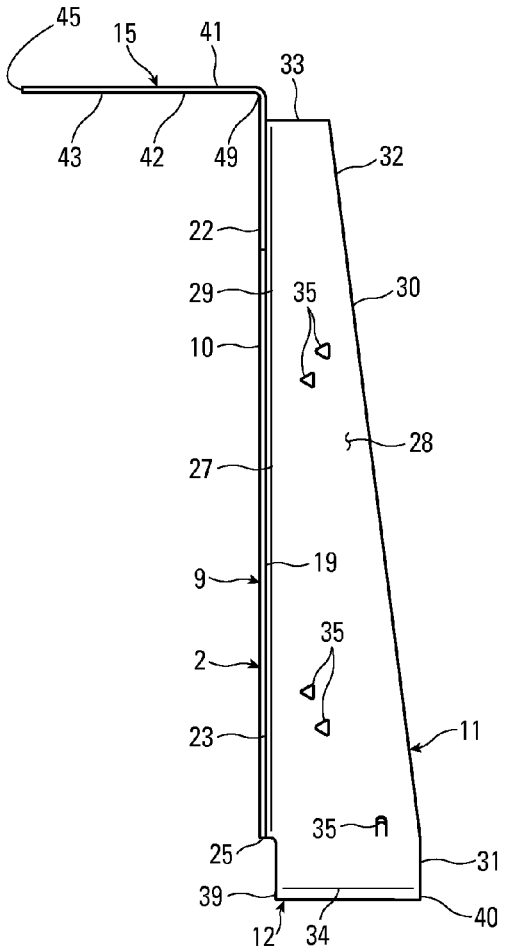
FIG. 9 is a left side elevation view of the joist hanger shown in FIG. 4.
Figure 10:
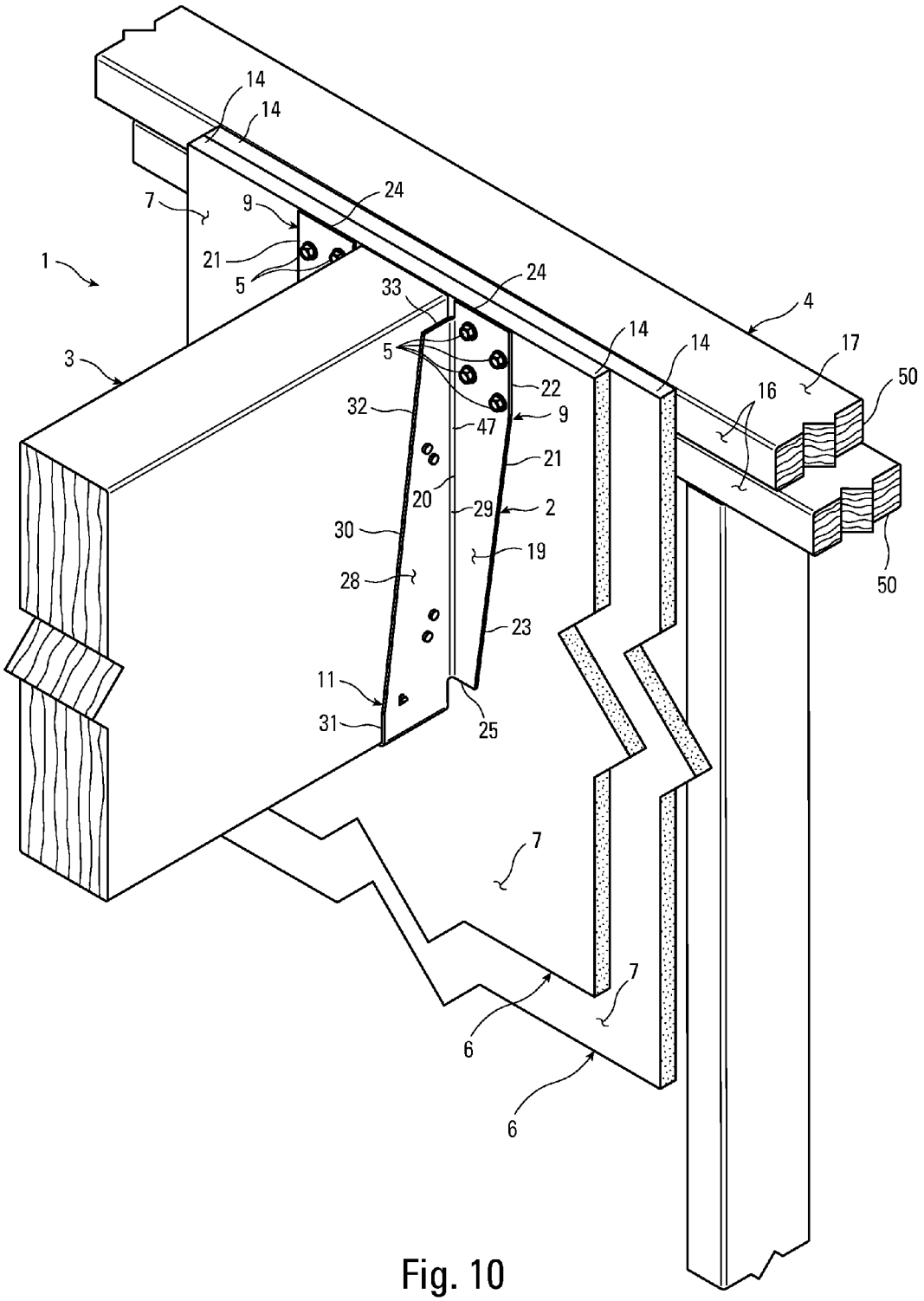
FIG. 10 is a an upper right perspective view of a connection formed according to the present invention in which the joist hanger does not have a pair of top flanges.

The first and second side members 11 preferably are planar as well, with first and second inner faces 27 that face the joist 3, and first and second outer faces 28 opposite the first and second inner faces 27. The first and second side members 11 preferably have first and second back edges 29 that form an angular joint 47, preferably orthogonal, where they meet the first and second inner edges 20 of the first and second back plate members 9. As shown in FIGS. 8 and 9, the first and second side members 11 preferably have first and second front edges 30 opposite the first and second back edges 29. The first and second front edges 30 preferably have first and second lower substantially vertical portions 31 and first and second upper slanted portions 32 that angled back toward the first and second back edges 29. The first and second side members 11 preferably have first and second top edges 33 slightly below the level of the first and second top edges 24 of the first and second back plate members 9. The first and second side members also preferably have first and second bottom edges 34 opposite the first and second top edges 33 and slightly above the level of the first and second bottom edges 25 of the first and second back plate members 9. The first and second side members 11 preferably are formed with fastener openings 35.

The one or more panels 6 preferably are drywall panels 6. Drywall, otherwise known as plasterboard, wallboard, gypsum board, sheetrock, or gyprock, is a panel made of gypsum plaster pressed between two thick sheets of paper. It is used to make interior walls and ceilings. In the United States and Canada, drywall panels are manufactured in 48-inch wide panels in varying lengths. Common panel thicknesses are ½-inch and ⅝-inch. In the present invention, two layers of ⅝-inch drywall is preferred. Drywall is naturally fire resistant and can be used to cover and protect the structural members of a building. However, gypsum is friable and has little or no dowel bearing strength. Other panel materials and qualities are also possible.

Preferably, the joist hanger has a seat member 12 interconnecting the first and second side members 11, and the joist 3 rests on the seat member 12 between the first and second side members 11. Preferably, no part of the joist hanger 2 contacts the front face 16 of the structural support member 4. The joist hanger 2 is not embedded in the structural support member 4. The seat member 12 preferably has a substantially horizontal upper face 36 that interfaces with the joist 3. The seat member 12 also preferably has a lower face 37 opposite the upper face 36, first and second linear side edges 38, a back edge 39 orthogonal to the first and second side edges 38, and a front edge 40 parallel to the back edge 39. The first and second side edges 38 preferably form an angular joint 48, preferably orthogonal, where they meet the first and second bottom edges 34 of the first and second side members 11.

Each of the one or more panels 6 preferably has a top edge face 14. In a preferred embodiment, the joist hanger 2 has a first top flange 15 connected to the first back plate member 9 and a second top flange 15 connected to the second back plate member 9. The first and second top flanges 15 preferably extend over the top edge faces 14 of the one or more panels 6 and are the only parts of the joist hanger that contact the structural support member 4. Preferably, the first and second top flanges 15 are fastened to the structural support member 4. The structural support member 4 preferably has a top face 17, the first and second top flanges 15 are fastened to the top face 17 of the structural support member 4. Preferably, the first and second top flanges 15 are fastened to the structural support member 4 with a second plurality of fasteners 5. Most preferably, these fasteners 5 are nails.

The first and second top flanges 15 preferably are planar, with first and second upper faces 41 and first and second bottom faces 42 opposite the first and second upper faces 41. Preferably, the first and second bottom faces 42 contact the top face 17 of the structural support member 4. The first and second top flanges 15 preferably have first and second parallel side edges 43, a first and second front edges 44 and first and second back edges 45. The first and second front edges 44 preferably form an angular joint 49, preferably orthogonal where they meet the first and second top edges 24 of the first and second back plate members 9. Preferably, the first and second top flanges 15 are formed with fastener openings 46.

Figure 18:
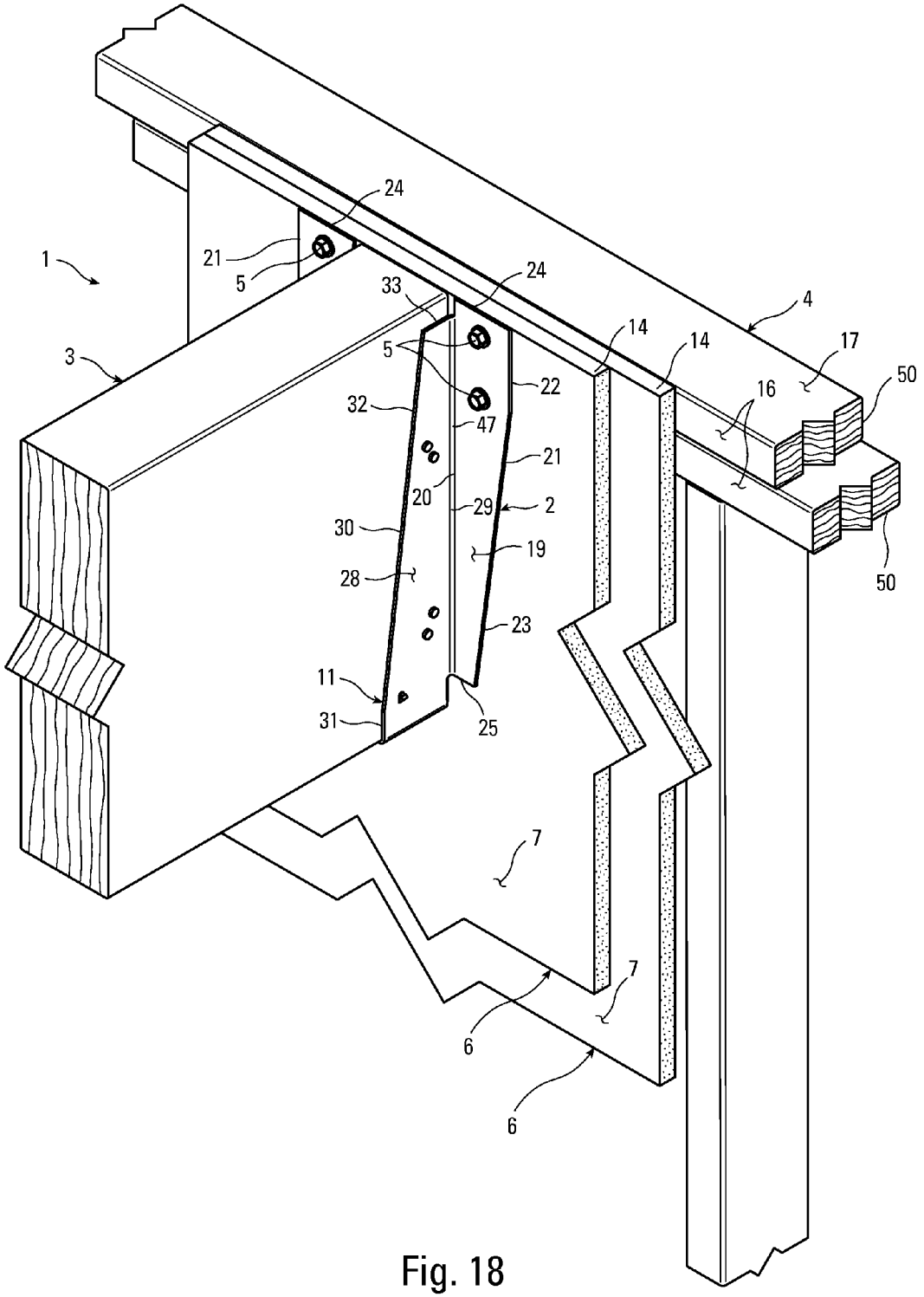
FIG. 18 is a an upper right perspective view of a connection formed according to the present invention in which the joist hanger does not have a pair of top flanges and each back plate member is attached with only two fasteners.

As shown in FIGS. 1, 3 and 18, the first plurality of fasteners 5 that attach the joist hanger 2 to the structural support member 4 preferably are all within the upper one-third of the first and second back plate members 9. Preferably, the structural support member 4 is a top plate 4 consisting of one or more parts 50 that have a height less than one-third the height of the joist hanger 2. The parts 50 of the top plate 4 preferably are two pieces of 2×4 dimensional lumber 50.

Preferably, each of the one or more panels 6 has a top edge face 14 and the structural support member 4 has a top face 17. The top edge face 14 of each of the one or more panels 6 preferably is located at the level of the top face 17 of the structural support member or above the top face 17 of the structural support member 4, thereby shielding the structural support member 4.

Preferably, the first and second back plate members 9 have first and second top edges 24, respectively. The first and second back faces 10 of the first and second back plate members 9 preferably interface with the front face 7 of the first panel 6 of the one or more panels 6 below the first plurality of fasteners 5 that pass through the first and second back faces 10 and the one or more panels 6 and into the structural support member 4. Preferably, the interface between first and second back faces 10 of the first and second back plate members 9 and the front face 7 of the first panel 6 of the one or more drywall panels 6 extends at least three times as far from the first and second top edges 24 of the first and second back plates 24 as the location of any of the first plurality of fasteners 5 in the first and second back plate members 9. This distributes pressure on the front face 7 of the first panel 6 of the one or more panels 6 so that the panels 6 are not crushed by the joist hanger 2.

Figure 19:
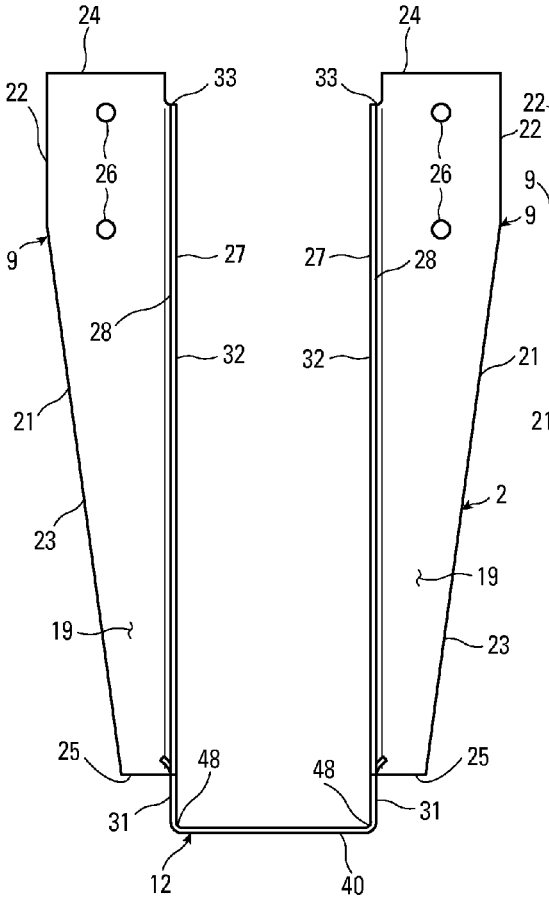
FIG. 19 is a front elevation view of the joist hanger shown in FIG. 18.
Figure 20:
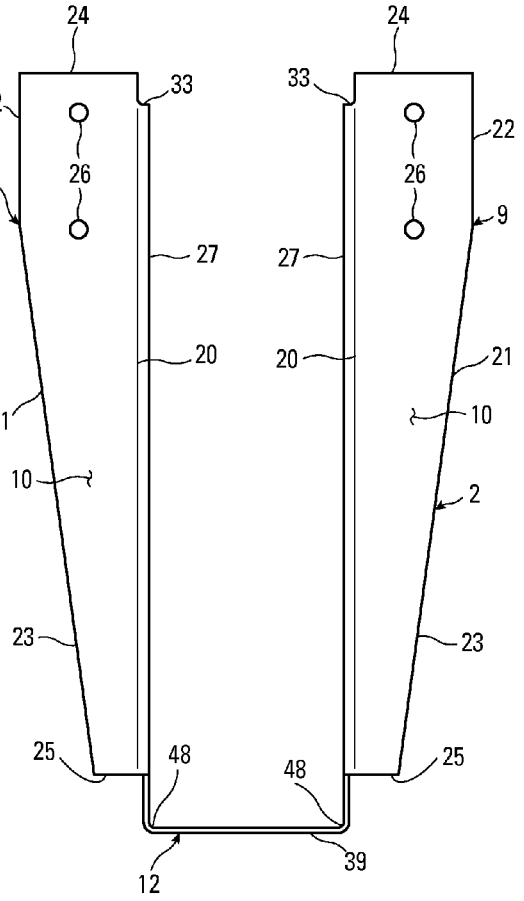
FIG. 20 is a rear elevation view of the joist hanger shown in FIG. 19.

In a preferred embodiment shown in FIGS. 18, 19 and 20, no more than two of the first plurality of fasteners 5 fastens each of the first and second back faces 10 of the first and second back plate members 9 to the structural support member 4 through the one or more panels 6. This arrangement achieves the highest load value per fastener 5, and the result is unexpected.

Figure 11:
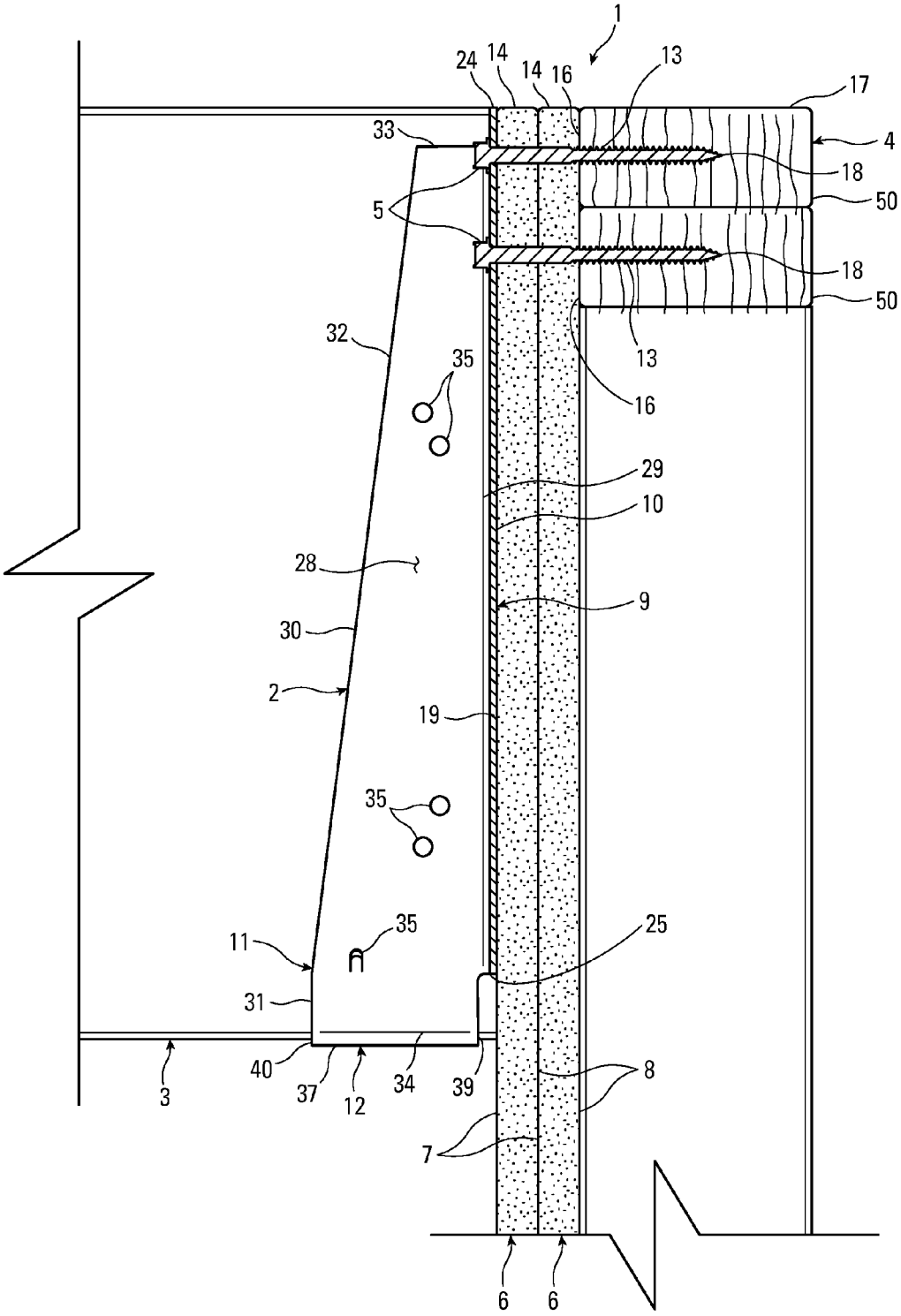
FIG. 11 is a cross-sectional right side elevation view of the connection shown in FIG. 10.
Figure 12:
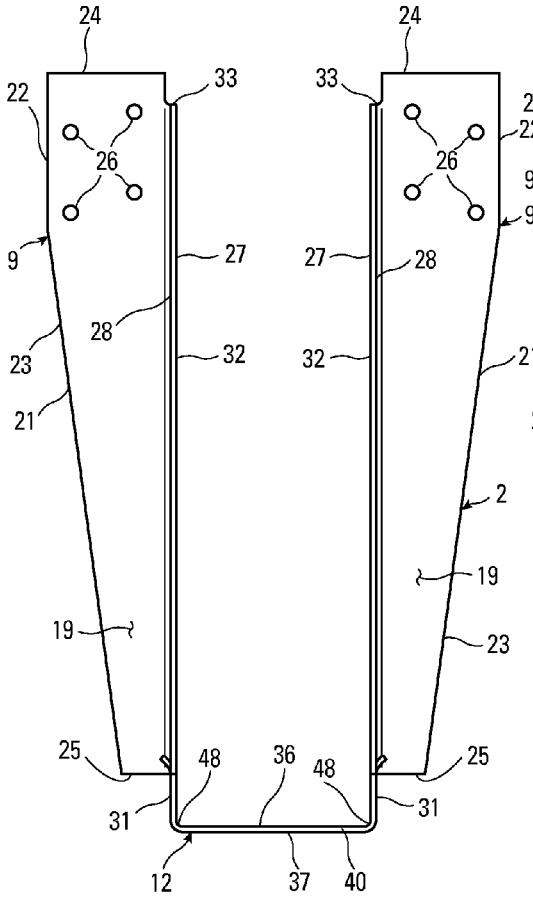
FIG. 12 is a front elevation view of the joist hanger shown in FIG. 10.
Figure 13:
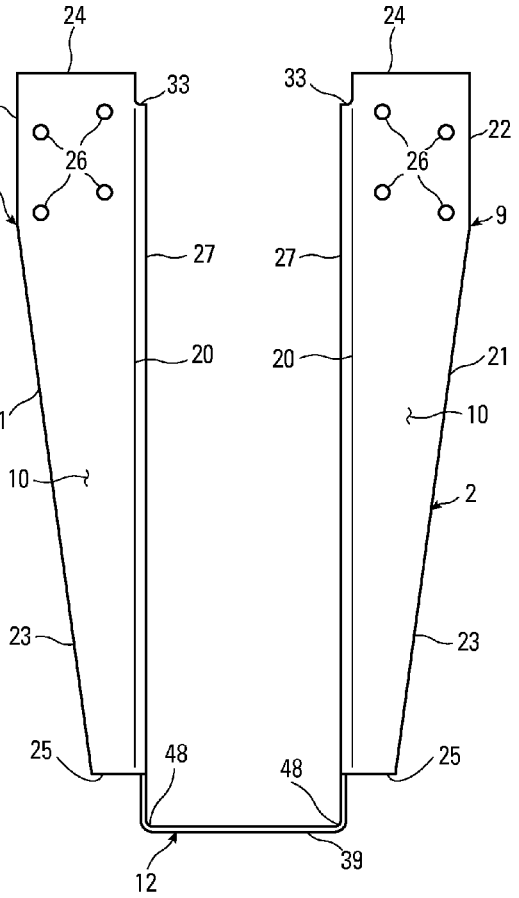
FIG. 13 is a rear elevation view of the joist hanger shown in FIG. 12.
Figure 14:
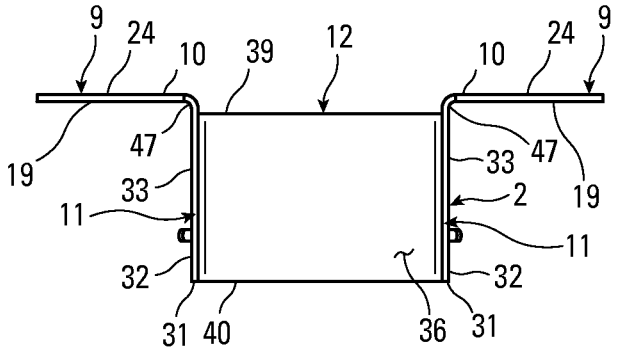
FIG. 14 is a top plan view of the joist hanger shown in FIG. 12.
Figure 15:
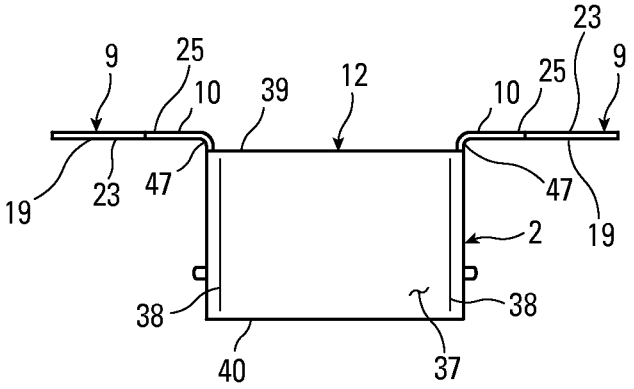
FIG. 15 is a bottom plan view of the joist hanger shown in FIG. 12.
Figure 16:
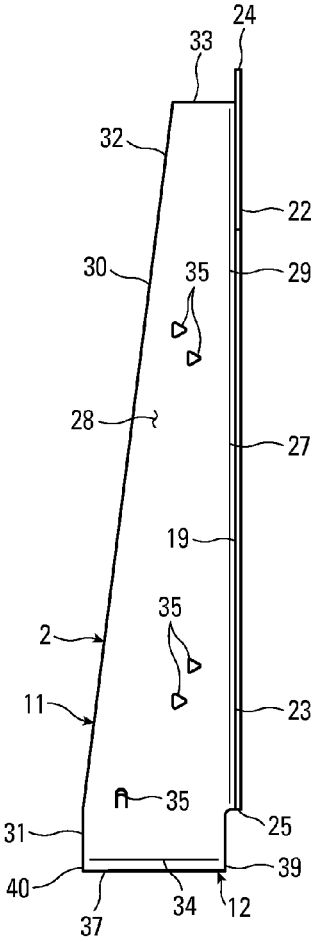
FIG. 16 is a right side elevation view of the joist hanger shown in FIG. 12.
Figure 17:
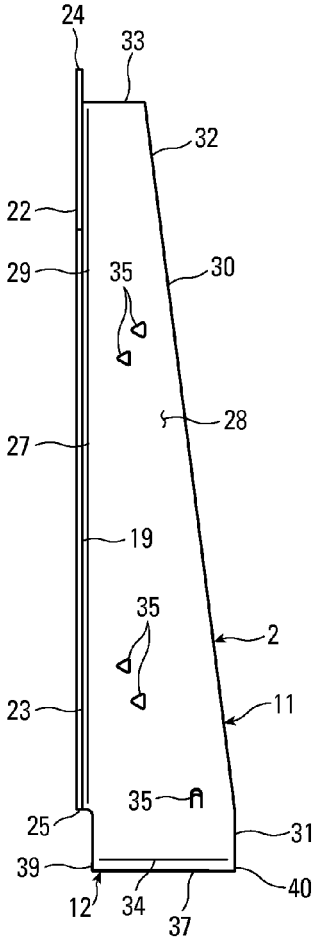
FIG. 17 is a left side elevation view of the joist hanger shown in FIG. 12.

As shown in FIG. 11, preferably, each of the first plurality of fasteners 5 is a screw 5 that has a tip 18 embedded in the structural support member 4. The screws 5 are cantilevered beyond the front face 16 of the structural support member 4, through the panels 6 which do little or nothing to support the shanks 13 of the screws 5. The most preferred fasteners 5 for the cantilevered attachment of the joist hanger 2 to the structural support member 4 are Simpson Strong-Tie SDS screws that have a 3.5-inch shank length and a ¼-inch shank diameter.

The joist hanger 2 preferably has a first back plate member 9 with a first plurality of fastener openings 26 that are all located in the upper third of the back plate member 9. Preferably, the joist hanger 2 has second back plate member 9 with a second plurality of fastener openings 26 that are all located in the upper third of the back plate member 9. The joist hanger 2 preferably has a first side member 11 connected to the first back plate member 9, the first side member 11 having a first top edge 33 below the first top edge 24 of the first back plate member 9. Preferably, the joist hanger has a second side member 11 connected to the second back plate member 9, the second side member 11 having a second top edge 33 below the second top edge 24 of the second back plate member 9.

Figure 4:
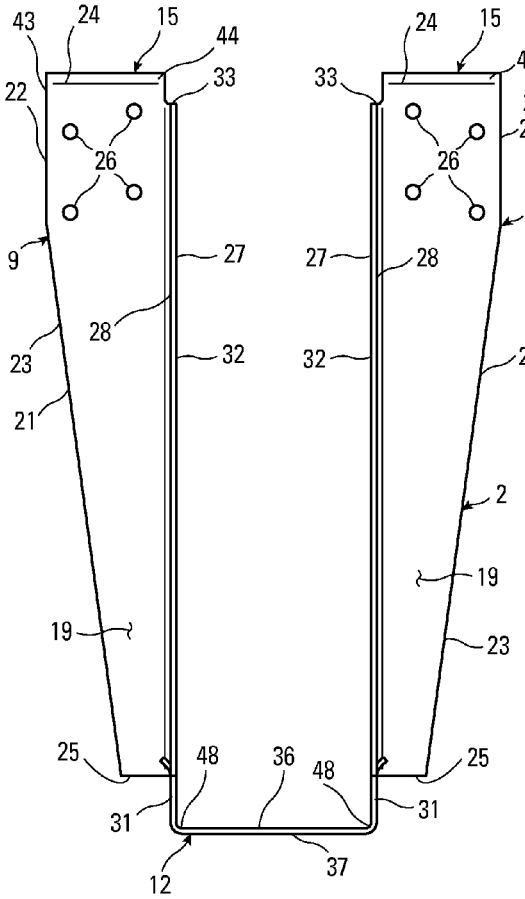
FIG. 4 is a front elevation view of the joist hanger shown in FIG. 1.
Figure 5:
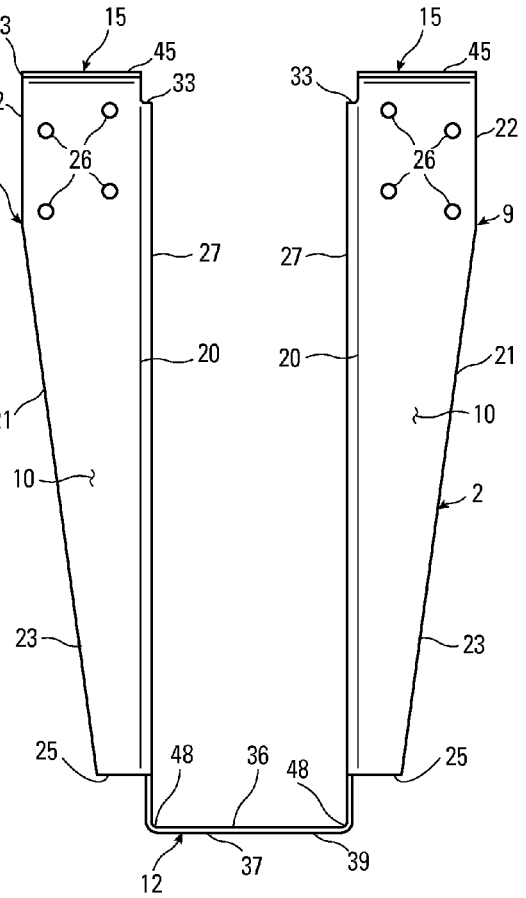
FIG. 5 is a rear elevation view of the joist hanger shown in FIG. 4.
Figure 6:
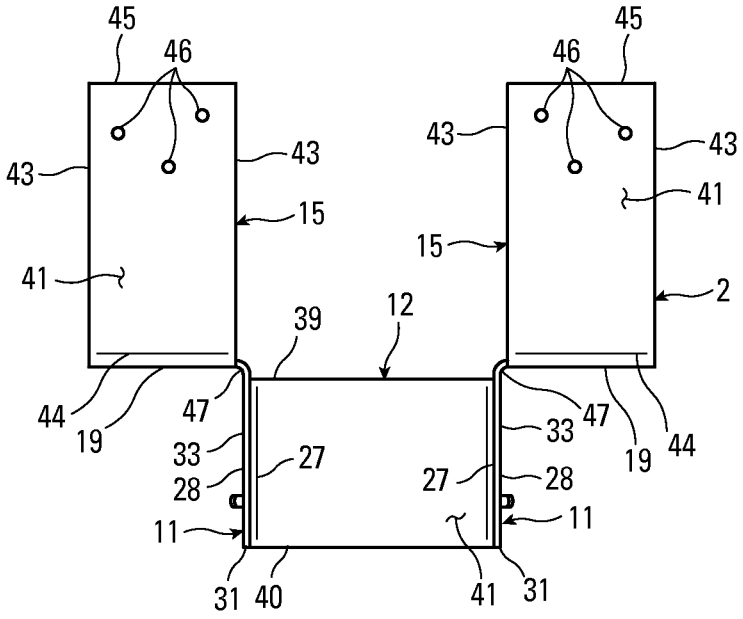
FIG. 6 is a top plan view of the joist hanger shown in FIG. 4.
Figure 7:
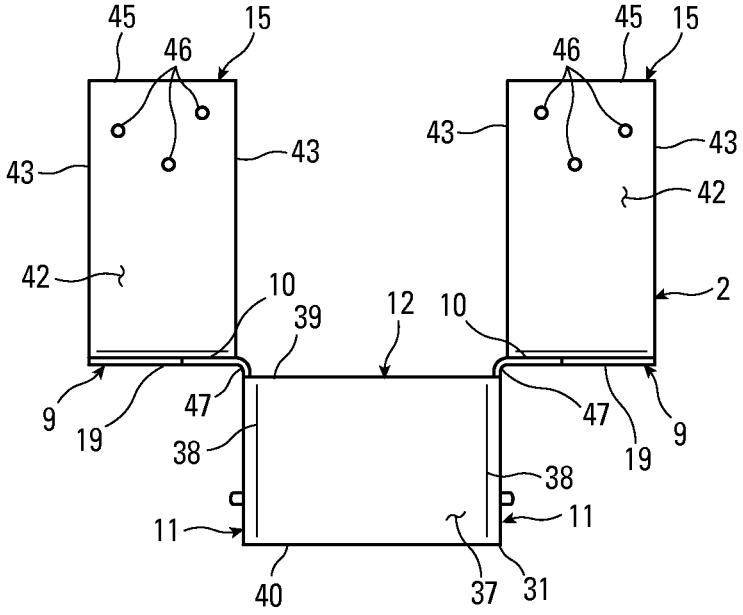
FIG. 7 is a bottom plan view of the joist hanger shown in FIG. 4.

At least one of the first plurality of fasteners 5 preferably passes through the first back plate member 9 and one or more panels 6 and into the structural support member 4. As shown in FIGS. 3, 4 and 5, preferably, no more than one of the plurality of fasteners 5 passes through the first back plate member 9 above the first side member 11. Similarly, at least one of the second plurality of fasteners 5 preferably passes through the second back plate member 9 and the one or more panels 6 and into the structural support member 4. Preferably, no more than one of the plurality of fasteners 5 passes through the second back plate member 9 above the first side member 11. The joist 3 preferably is supported by the joist hanger 2.

Preferably, the first and second back plate members 9 have first and second top edges 24, respectively. The first and second back faces 10 of the first and second back plate members 9 preferably interface with the front face 7 of the first panel 6 of the one or more panels 6 below the first plurality of fasteners 5 that pass through the first and second back faces 10 and the one or more panels 6 and into the structural support member 4. Preferably, the interface between first and second back face 10 of the first and second back plate member 9 and the front face 7 of the first panel 6 of the one or more drywall panels 6 extends at least three times as far from the first and second top edges 24 of the first and second back plates 24 as any of the first plurality of fasteners 5.

As shown in FIGS. 4 and 5, the first back plate member 9 preferably has a first top edge 24, a first bottom edge 25, a first substantially vertical inner edge 20, a first outer edge 21 substantially parallel to the first substantially vertical inner edge 20 near the first top edge 24 and converging toward the substantially vertical inner edge 20 near the bottom edge 25, a first back face 10 in parallel registration with the front face 7 of a first panel 6 of the one or more panels 6, and a first plurality of fastener openings 26 between the parallel portions of the first substantially vertical inner edge 20 and the first outer edge 21. Preferably, the second back plate member 9 also has a second top edge 24, a second bottom edge 25, a second substantially vertical inner edge 20, a second outer edge 21 substantially parallel to the second substantially vertical inner edge 20 near the second top edge 24 and converging toward the substantially vertical inner edge 20 near the bottom edge 25, a second back face 10 in parallel registration with the front face 7 of a first panel 6 of the one or more panels 6, and a second plurality of fastener openings 26 between the parallel portions of the second substantially vertical inner edge 20 and the second outer edge 21.

The first and second back faces 10 of the first and second back plate members 9 preferably interface with the front face 7 of the first panel 6 of the one or more panels 6 adjacent and between each of the first plurality of fasteners 5 that pass through the first and second back faces 10 and the one or more panels 6 and into the structural support member 4.

Substantially all of the first and second back faces 10 of the first and second back plate members 9 preferably interfaces with the front face 7 of the first panel 6 of the one or more panels 6. Preferably, the back face 8 of one panel 6 of the one or more panels 6 interfaces with the front face 16 of the first structural support member 4 where the first plurality of fasteners 5 attach the joist hanger 2 to the structural support member 4 through the one or more panels 6.

We claim:

1. A connection (1) utilizing a joist hanger (2) to hang a generally horizontal joist (3) from a wood structural support member (4) in cooperation with a first plurality of fasteners (5) and one or more generally vertical drywall panels (6), the connection (1) comprising:

a. the one or more drywall panels (6) shielding the wood structural support member (4), each having a front face (7), a back face (8) opposite the front face (7), the one or more drywall panels (6) being drywall panels such that they have negligible dowel bearing strength compared to the wood structural support member (4);

b. the first plurality of fasteners (5), each of the first plurality of fasteners (5) having a shank (13);

c. the wood structural support member (4) having a generally vertical front face (16) and the wood structural support member (4) having significant dowel bearing strength compared to the drywall panels (6), the wood structural support member (4) supporting the shanks (13) of the first plurality of fasteners (5);

d. the joist (3); and e the joist hanger (2) supporting the joist (3), the joist hanger (2) comprising:

i. a first back plate member (9) with a first back face (10) in parallel registration with the front face (7) of a first panel (6) of the one or more drywall panels (6);

ii. a second back plate member (9) with a second back face (10) in parallel registration with the front face (7) of the first panel (6) of the one or more drywall panels (6);

iii. a first side member (11) connected to the first back plate member (9); and iv. a second side member (11) connected to the second back plate member (9), wherein:

(a) at least one of the first plurality of fasteners (5) passes through the first back plate member (9) and the one or more panels (6) and into the wood structural support member (4);

(b) at least one of the first plurality of fasteners (5) passes through the second back plate member (9) and the one or more drywall panels (6) and into the wood structural support member (4);

(c) the joist (3) is supported by the joist hanger (2); and (d) the one or more drywall panels (6) are between the joist hanger (2) and the wood structural support member (4) and the back face (8) of one panel (6) of the one or more drywall panels (6) interfaces with the front face (16) of the wood structural support member (4).

2. The connection (1) of claim 1 wherein:

a. the joist hanger has a seat member (12) interconnecting the first and second side members (11); wherein:

i. the joist (3) rests on the seat member (12) between the first and second side members (11).

3. The connection (1) of claim 1 wherein:

a. no part of the joist hanger (2) contacts the front face (16) of the wood structural support member (4).

4. The connection (1) of claim 3 wherein:

a. each of the one or more drywall panels (6) has a top edge face (14);

b. the joist hanger (2) has a first top flange (15) connected to the first back plate member (9) and a second top flange (15) connected to the second back plate member (9); wherein:

i. the first and second top flanges (15) extend over the top edge faces (14) of the one or more drywall panels (6) and are the only parts of the joist hanger that contact the wood structural support member (4).

5. The connection (1) of claim 4 wherein:

a. the first and second top flanges (15) are fastened to the wood structural support member (4).

6. The connection (1) of claim 5 wherein:

a. the wood structural support member (4) has a top face (17); and b. the first and second top flanges (15) are fastened to the top face (17) of the wood structural support member (4).

7. The connection (1) of claim 6 wherein:

a. the first and second top flanges (15) are fastened to the wood structural support member (4) with a second plurality of fasteners (5).

8. The connection (1) of claim 1 wherein:

a. the first plurality of fasteners (5) that attach the joist hanger (2) to the wood structural support member (4) are all within the upper one-third of the first and second back plate members (9).

9. The connection (1) of claim 8 wherein:

a. the wood structural support member (4) is a top plate (4) having one or more parts (50), and the top plate has a height less than one-third the height of the joist hanger (2).

10. The connection (1) of claim 9 wherein:

a. the parts (50) of the top plate (4) are two pieces of 2×4 dimensional lumber (50).

11. The connection (1) of claim 1 wherein:

a. each of the one or more drywall panels (6) has a top edge face (14);

b. the wood structural support member (4) has a top face (17); and c. the top edge face (14) of each of the one or more drywall panels (6) is located at the level of the top face (17) of the wood structural support member (4) or above the top face (17) of the wood structural support member (4).

12. The connection (1) of claim 1 wherein:

a. the first and second back plate members (9) have first and second top edges (24), respectively; and b. the first and second back faces (10) of the first and second back plate members (9) interface with the front face (7) of the first panel (6) of the one or more drywall panels (6) below the first plurality of fasteners (5) that pass through the first and second back faces (10) and the one or more drywall panels (6) and into the wood structural support member (4), wherein:

i. the interface between first and second back faces (10) of the first and second back plate members (9) and the front face (7) of the first panel (6) of the one or more drywall panels (6) extends at least three times as far from the first and second top edges (24) of the first and second back plates (24) as the location of any of the first plurality of fasteners (5) in the first and second back plate members (9).

13. The connection (1) of claim 1 wherein:

a. no more than two of the first plurality of fasteners (5) fastens each of the first and second back faces (10) of the first and second back plate members (9) to the wood structural support member (4) through the one or more drywall panels (6).

14. The connection (1) of claim 1 wherein:

a. each of the first plurality of fasteners (5) is a screw (5) that has a tip (18) embedded in the wood structural support member (4).

15. A connection (1) utilizing a joist hanger (2) to attach a joist (3) to a wood structural support member (4) in cooperation with a first plurality of fasteners (5) and one or more drywall panels (6), the connection comprising:

a. the one or more drywall panels (6), each having a front face (7) and a back face (8) the one or more drywall panels (6) being drywall panels such that they have negligible dowel bearing strength compared to the wood structural support member (4);

b. the first plurality of fasteners, each of the first plurality of fasteners (5) having a shank (13); and c. the wood structural support member (4), the structural support member (4) having significant dowel bearing strength compared to the drywall panels (6), the wood structural support member (4) supporting the shanks (13) of the first plurality of fasteners (5);

d. the joist (3);

e the joist hanger (2), the joist hanger (2) comprising:

i. a first back plate member (9) with a first plurality of fastener openings (26) that are all located in the upper third of the back plate member (9);

ii. a second back plate member (9) with a second plurality of fastener openings (26) that are all located in the upper third of the back plate member (9);

iii. a first side member (11) connected to the first back plate member (9), the first side member (11) having a first top edge (33) below the first top edge (24) of the first back plate member (9); and iv. a second side member (11) connected to the second back plate member (9), the second side member (11) having a second top edge (33) below the second top edge (24) of the second back plate member (9), wherein:

(a) at least one of the first plurality of fasteners (5) passes through the first back plate member (9) and one or more panels (6) and into the wood structural support member (4);

(b) no more than one of the plurality of fasteners (5) passes through the first back plate member (9) above the first side member (11);

(c) at least one of the second plurality of fasteners (5) passes through the second back plate member (9) and the one or more panels (6) and into the wood structural support member (4);

(d) no more than one of the plurality of fasteners (5) passes through the second back plate member (9) above the first side member (11); and (e) the joist (3) is supported by the joist hanger (2).

16. The connection (1) of claim 15 wherein:

a. the joist hanger has a seat member (12) interconnecting the first and second side members (11); wherein:

i. the joist (3) rests on the seat member (12) between the first and second side members (11).

17. The connection (1) of claim 15 wherein:

a. the first and second back plate members (9) have first and second top edges (24), respectively; and b. the first and second back faces (10) of the first and second back plate members (9) interface with the front face (7) of the first panel (6) of the one or more drywall panels (6) below the first plurality of fasteners (5) that pass through the first and second back faces (10) and the one or more drywall panels (6) and into the wood structural support member (4), wherein:

i. the interface between first and second back face (10) of the first and second back plate member (9) and the front face (7) of the first panel (6) of the one or more drywall panels (6) extends at least three times as far from the first and second top edges (24) of the first and second back plates (24) as any of the first plurality of fasteners (5).

18. The connection (1) of claim 15 wherein:

a. no more than two of the first plurality of fasteners (5) fastens each of the first and second back faces (10) of the first and second back plate members (9) to the wood structural support member (4) through the one or more drywall panels (6).

19. A connection (1) utilizing a joist hanger (2) to attach a first generally horizontal joist (3) to a first *generally* horizontal wood structural support member (4) [in cooperation with a first plurality of fasteners (5)] and one or more generally vertical drywall panels (6), the connection (1) comprising:

a. the one or more drywall panels (6), each having a front face (7), a back face (8) opposite the front face (7), the *one or more* drywall panels (6) being drywall panels such that they have negligible dowel bearing strength compared to the first wood structural support member (4);

b. [the first plurality of fasteners, each of the first plurality of fasteners (5) having a shank (13)] *one or more cantilevers that hold the joist hanger away from the first generally horizontal wood structural support member*;

c. the first wood structural support member (4) having significant dowel bearing strength compared to the *one or more* drywall panels (6), the first wood structural support member (4) supporting the [shanks (13) of the first plurality of fasteners (5)] *one or more cantilevers*;

d. the joist (3); and e. the joist hanger (2), the joist hanger (2) comprising:

i. [a first] *one or more* back plate [member] *members* (9) with a first back face (10) in parallel registration with the front face (7) of a first panel (6) of the one or more *drywall* panels (6);

ii. [a second back plate member (9) with a second back face (10) in parallel registration with the front face (7) of the first panel (6) of the one or more panels (6);

iii. a first] *one or more* side [member] *members* (11) connected to the [first] *one or more* back plate [member] *members* (9)[; and iv. a second side member (11) connected to the second back plate member (9)], wherein:

(a) [at least one of the first plurality of fasteners (5) passes] *the one or more cantilevers pass* through [the first back plate member (9) and] the one or more *drywall* panels (6) and [into] *are supported by* the first wood structural support member (4) *and support the joist hanger* (*2*);

(b) [at least one of the first plurality of fasteners (5) passes through the second back plate member (9) and the one or more panels (6) and into the first wood structural support member (4);

(c)] the joist (3) is supported by the joist hanger (2); and

[(d)] (*c*) the one or more panels (6) are between the joist [hanger (2)] (*3*) and the first wood structural support member (4).

20. The connection (1) of claim 19 wherein:

a. the [first] *one or more* back plate [member] *members* (9) [has] *have* a first top edge (24), a first bottom edge (25), a first generally vertical inner edge (20), a first outer edge (21) [substantially] *generally* parallel to the first generally vertical inner edge (20) near the first top edge (24) and converging toward the generally vertical inner edge [(20)] (*20*) near the bottom edge (25), a first back face (10) in parallel registration with the front face (7) of a first panel (6) of the one or more drywall panels (6), and a first plurality of fastener openings (26) between the parallel portions of the first generally vertical inner edge (20) and the first outer edge (21)[; and b. the second back plate member (9) has a second top edge (24), a second bottom edge (25), a second generally vertical inner edge (20), a second outer edge (21) generally parallel to the second generally vertical inner edge (20) near the second top edge (24) and converging toward the generally vertical inner edge (20) near the bottom edge (25), a second back face (10) in parallel registration with the front face (7) of a first panel (6) of the one or more drywall panels (6), and a second plurality of fastener openings (26) between the parallel portions of the second generally vertical inner edge (20) and the second outer edge (21)].

21. The connection (1) of claim 19 wherein:

a. the joist hanger has a seat member (12) [interconnecting the first and second] *connected to the one or more* side members (11); wherein:

i. the joist (3) rests on the seat member (12)[between the first and second side members (11)].

[22. The connection (1) of claim 19 wherein:

a. the first and second back plate member (9) have first and second top edges (24), respectively; and b. the first and second back faces (10) of the first and second back plate members (9) interface with the front face (7) of the first panel (6) of the one or more drywall panels (6) below the first plurality of fasteners (5) that pass through the first and second back faces (10) and the one or more drywall panels (6) and into the first wood structural support member (4), wherein:

i. the interface between first and second back face (10) of the first and second back plate member (9) and the front face (7) of the first panel (6) of the one or more drywall panels (6) extends at least three times as far from the first and second top edges (24) of the first and second back plates (24) as any of the first plurality of fasteners (5).]

[23. The connection (1) of claim 19 wherein:

a. no more than two of the first plurality of fasteners (5) fastens each of the first and second back faces (10) of the first and second back plate members (9) to the first wood structural support member (4) through the one or more drywall panels (6).]

*24. The connection (1) of claim 19 wherein:*

*a. each of the one or more drywall panels (6) has a top edge face (14);*

*b. the joist hanger (2) has one or more top flanges (15); wherein:*

*i. the one or more top flanges (15) extend over the top edge faces (14) of the one or more drywall panels (6).*

*25. The connection (1) of claim 24 wherein:*

*a. the one or more top flanges (15) are fastened to the wood structural support member (4).*

*26. The connection (1) of claim 25 wherein:*

*a. the wood structural support member (4) has a top face (17); and*

*b. the one or more top flanges (15) are fastened to the top face (17) of the wood structural support member (4).*

*27. The connection (1) of claim 26 wherein:*

*a. the one or more top flanges (15) are fastened to the structural support member (4) with a plurality of fasteners (5).*

*28. The connection (1) of claim 27 wherein:*

*a. the wood structural support member (4) is a top plate (4) having one or more parts (50), and the top plate has a height less than one-third the height of the joist hanger (2).*

*29. The connection (1) of claim 28 wherein:*

*a. the parts (50) of the top plate (4) are two pieces of 2×4 dimensional lumber (50).*

*30. The connection (1) of claim 19 wherein:*

*a. each of the one or more drywall panels (6) has a top edge face (14);*

*b. the wood structural support member (4) has a top face (17); and*

*c. the top edge face (14) of each of the one or more drywall panels (6) is located at the level of the top face (17) of the wood structural support member (4) or above the top face (17) of the wood structural support member (4).*

*31. The connection (1) of claim 19 wherein:*

*a. the joist hanger (2) has one or more top flanges (15) that are fastened to the wood structural support member (4).*

*32. The connection (1) of claim 31 wherein:*

*a. the wood structural support member (4) has a top face (17); and*

*b. the one or more top flanges (15) are fastened to the top face (17) of the wood structural support member (4).*

*33. The connection (1) of claim 32 wherein:*

*a. the one or more top flanges (15) are fastened to the structural support member (4) with a plurality of fasteners (5).*

*34. The connection (1) of claim 33 wherein:*

*a. the wood structural support member (4) is a top plate (4) having one or more parts (50), and the top plate has a height less than one-third the height of the joist hanger (2).*

*35. The connection (1) of claim 34 wherein:*

*a. the parts (50) of the top plate (4) are two pieces of 2×4 dimensional lumber (50).*

*36. The connection (1) of claim 31 wherein:*

*a. each of the one or more drywall panels (6) has a top edge face (14);*

*b. the wood structural support member (4) has a top face (17); and*

*c. the top edge face (14) of each of the one or more drywall panels (6) is located at the level of the top face (17) of the wood structural support member (4) or above the top face (17) of the wood structural support member (4).*

* * * * *